(12) United States Patent
Hill et al.

(10) Patent No.: US 7,017,857 B2
(45) Date of Patent: Mar. 28, 2006

(54) ACTIVE VIBRATION CONTROL SYSTEM

(75) Inventors: Wayne Hill, Westborough, MA (US); Lev S. Tsimring, San Diego, CA (US)

(73) Assignee: Foster-Miller, Inc., Waltham, MA (US)

( * ) Notice: Subject to any disclaimer, the term of this patent is extended or adjusted under 35 U.S.C. 154(b) by 118 days.

(21) Appl. No.: 10/244,583

(22) Filed: Sep. 16, 2002

(65) Prior Publication Data

US 2004/0050999 A1 Mar. 18, 2004

(51) Int. Cl.
*B64C 27/51* (2006.01)

(52) U.S. Cl. .................................................. 244/17.13
(58) Field of Classification Search .............. 244/17.27, 244/17.11, 17.13, 54; 248/550; 416/500, 416/550
See application file for complete search history.

(56) References Cited

U.S. PATENT DOCUMENTS

| | | | | |
|---|---|---|---|---|
| 4,819,182 | A | * | 4/1989 | King et al. |
| 5,135,186 | A | * | 8/1992 | Ako |
| 5,242,130 | A | * | 9/1993 | Mouille et al. |
| 5,316,240 | A | * | 5/1994 | Girard et al. ............ 244/17.27 |
| 5,383,133 | A | * | 1/1995 | Staple |
| 5,732,905 | A | * | 3/1998 | Krysinski |
| 5,734,246 | A | | 3/1998 | Falangas |
| 5,853,144 | A | * | 12/1998 | Vincent |
| 5,880,362 | A | * | 3/1999 | Tang et al. |
| 5,973,441 | A | * | 10/1999 | Lo et al. |
| 6,053,269 | A | * | 4/2000 | Patten |
| 6,272,763 | B1 | | 8/2001 | Yamaguchi et al. |
| 6,460,803 | B1 | * | 10/2002 | Kiss et al. |

FOREIGN PATENT DOCUMENTS

EP WO 01/81108 A2 11/2001

OTHER PUBLICATIONS

Abarbanel et al. "The Analysis of Observed Chaotic Data in Physical Systems", Rev. Mod. Phys., vol. 65, No. 4, Oct. 1993, pp. 1331–1392.

N.F. Rulkov et al. "Tracking Unstable Orbits in Chaos Using Dissipative Feedback Control", The American Physical Society, Physical Review E, vol. 50, No. 1, Jul. 1994, pp. 314–324.

Henry D.I. Abarbanel, Lev Korzonov, Alistair I. Mees, Igor M. Starobinets, "Optimal Control of Nonlinear Systems to Given Orbits", Systems & Control Letters, V. 31, 1997, pp. 263–276.

Rhodes et al., "Data–based Control Trajectory Planning for Nonlinear Systems", Physical Review E, vol. 56, No. 3., Sep. 1997, pp. 2398–2406.

Friedman et al., "An Algorithm for Finding Best Matches in Logarithmic Expected Time", ACM Transactions on Mathematical Software, vol. 3, No. 3, Sep. 1977, pp. 209–226.

Henry D.I. Abarbanel, "Analysis of Observed Chaotic Data", Institute for Nonlinear Science, Springer Publication, 1996, pp. i–272.

D.E. Heverly II et al., "An Optimal Actuator Placement Methodology for Active Control of Helicopter Airframe Vibrations", Journal of the American Helicopter Society, American Helicopter Society, New York, US, vol. 46, No. 4, Oct. 2001, pp. 251–261.

* cited by examiner

Primary Examiner—Tien Dinh
(74) Attorney, Agent, or Firm—Iandiorio & Teska

(57) ABSTRACT

An active vibration control system including a sensor responsive to a source of vibration and which provides an output signal representative of the vibrations; at least one actuator positioned to impart canceling vibrations to the source of vibrations based on an input signal; a correction subsystem responsive to the actuator for estimating the sensor output in the absence of the canceling vibrations and which outputs a corrected output signal representative only of the vibrations emanating from the source; and a state space predictor responsive to the corrected output signal for determining the input signal to the actuator based on variations in the corrected output signal to better control vibrations especially in chaotic systems.

20 Claims, 15 Drawing Sheets

ACTIVE VIBRATION CONTROL SYSTEM

GOVERNMENT RIGHTS LEGEND

The invention was made in part under Government Contract No. NOO421-96-C-1120. The U.S. Government may have certain rights in this invention.

FIELD OF THE INVENTION

This invention relates to an active vibration control system useful, for example, to control vibrations caused by the rotor, gear box, and engine assembly of a helicopter and to isolate structures from sources of vibration.

BACKGROUND OF THE INVENTION

Vibrations can cause unwanted noise, material fatigue, and even catastrophic failure of systems. In response, active vibration control systems are sometimes employed. In general, the control system detects the amplitude and frequency of the vibrations emanating from a vibrating source and attempts to cancel them out by imparting canceling forces.

In one prior art system, vibrations of the rotor, gear box, and engine assembly of a helicopter (e.g., the Westland-Agusta EH-101 Merlin helicopter) are controlled by a system including accelerometers on the helicopter fuselage which detect vibrations; actuators between the fuselage and the rotor, gear box, and engine assembly; and a processing system which drives the actuators in response to the accelerometer signals. See, for example, U.S. Pat. No. 5,853,144 incorporated herein by this reference.

There are two primary problems associated with this and other prior art active vibration control systems. The first is complexity. Typically, numerous accelerometers are required on different portions of the fuselage and each accelerometer has a different output signal since it detects vibrations of different amplitude and frequency depending on its location on the fuselage. Processing all the accelerometer signals and then deciding how to properly drive the actuators in response is very difficult and results in severe computational complexity.

Second, such a system is based on the premise that the vibrations are periodic comprising one or more steady sinusoidal behaviors that are summed together. In truth, they are not periodic: during each revolution of the rotor, the amplitude of the vibrations change, and as between successive rotations, the vibrations are not the same even when the rotor speed and airspeed remain constant. The result is that present systems do not always sufficiently cancel the resulting vibrations when employed with sources of vibrations exhibiting irregular chaotic behavior.

SUMMARY OF THE INVENTION

It is therefore an object of this invention to provide a better active vibration control system.

It is a further object of this invention to provide such an active vibration control system which requires less computational complexity.

It is a further object of this invention to provide such an active vibration control system which dampens vibrations even in chaotic systems.

It is a further object of this invention to provide such an active vibration control system which takes advantage of and implements the current theories regarding non-linear dynamics, state space analysis, and controlling chaotic systems.

This invention results from the realization that the computational complexity of the prior art active vibration isolation systems can be reduced by a single accelerometer attached to the source of vibrations, a correction subsystem which estimates the output of that accelerometer in the absence of the controlling vibrations caused by the actuators and which drives the actuators according to the estimate thereby eliminating the need for numerous accelerometers on the structure and that even chaotic vibrations can be controlled a) by relying on the fact that they are deterministic and b) by employing a state space predictor which analyzes variations in the accelerometer's signal to better drive the actuators to control even chaotic vibrations.

This invention features an active vibration control system comprising a sensor responsive to a source of vibration which provides an output signal representative of the vibrations; at least one actuator positioned to impart canceling vibrations to the source of vibrations based on an input signal; a correction subsystem responsive to the actuator for estimating the sensor output in the absence of the canceling vibrations and which outputs a corrected output signal representative only of the vibrations emanating from the source; and a state space predictor responsive to the corrected output signal for determining the input signal to the actuator based on variations in the corrected output signal to better control vibrations especially in chaotic systems.

The sensor is typically an accelerometer which is physically connected to the source of vibration. The actuator may be an electro-hydraulic actuator. Typically, there are a plurality of actuators each mounted between the source of vibrations and the structure to be isolated from the source of vibrations.

In one embodiment, the source of vibrations is the rotor, gear box, and engine assembly of helicopter, the sensor is an accelerometer attached to the gear box, and the actuator is positioned between the airframe of the helicopter and the rotor, gear box, and engine assembly. The improved active vibration control system of this invention includes a source of vibrations, a structure which is impacted by the source of vibrations, a sensor or sensors connected to the structure, an actuator or actuators positioned to impart canceling vibrations to the source; and an analyzer/control subsystem responsive to the sensor or sensors for driving the actuator or actuators. The improvement comprises a sensor to be positioned to detect vibrations directly from the source; and a software package including: a correction subsystem responsive to the actuator for estimating the sensor output in the absence of the canceling vibrations and which outputs a corrected output signal representative only of the vibrations emanating from the source; and a state space predictor responsive to the corrected output signal for determining the input signal to the actuator based on variations in the corrected output signal to better control vibrations especially in a chaotic system. The active vibration control system of this invention includes a sensor responsive to a source of vibration which provides an output signal representative of the vibrations; at least one actuator positioned to impart canceling vibrations to the source of vibrations based on an input signal; and a correction subsystem responsive to the actuator for estimating the sensor output in the absence of the canceling vibrations and which outputs a corrected output signal representative only of the vibrations emanating from the source. A sensor is responsive to a source of vibration which provides an output signal representative of the vibrations. At least one actuator is positioned to impart canceling vibrations to the source of vibrations based on an input signal. A state space predictor is responsive to the output signal for determining the input signal to the actuator based on variations in the output signal to better control vibrations especially in chaotic systems.

BRIEF DESCRIPTION OF THE DRAWINGS

Other objects, features and advantages will occur to those skilled in the art from the following description of a preferred embodiment and the accompanying drawings, in which.

DISCLOSURE OF THE PREFERRED EMBODIMENT

Figure 1:
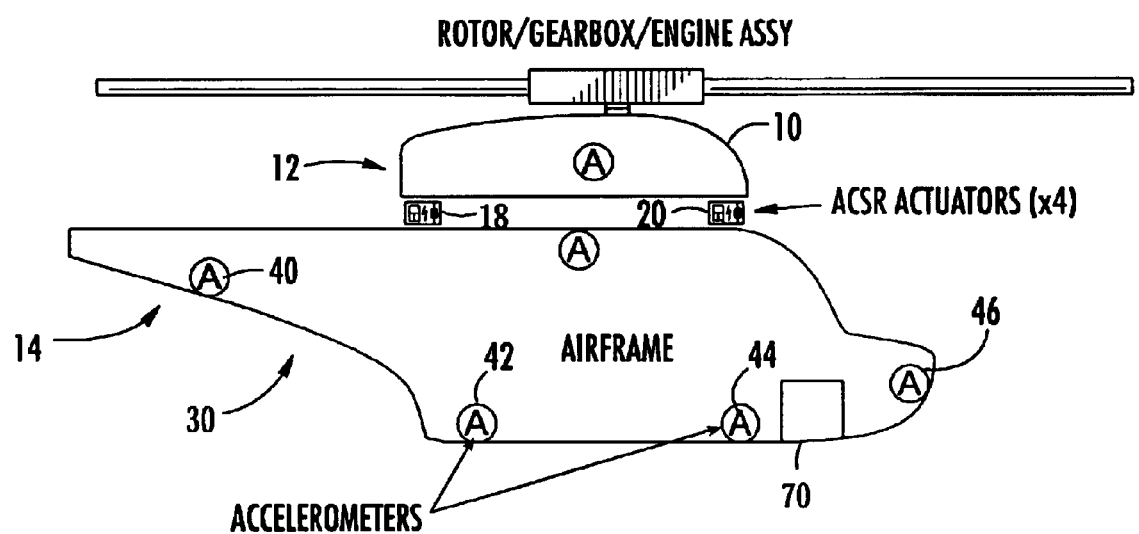
FIG. 1 is a schematic view of a helicopter employing the active vibration control system of the subject invention.

The active vibration control system of this invention features sensor 10, FIG. 1 responsive to a source of vibration. In this example, sensor 10 is an accelerometer attached directly to the gear box of the rotor, gear box, and engine assembly 12 of helicopter 14. Typically four electro-hydraulic actuators are used to impart canceling vibrations to the source of vibrations, engine assembly 12. In FIG. 1, two actuators 18 and 20 are shown between rotor, gear box, and engine assembly 12 and airframe 30, the structure to be isolated from vibrations caused by the rotor gear box, and the engine assembly of helicopter 14.

In the prior art, no accelerometer is attached directly to the source of vibrations and instead accelerometers 40, 42, 44, and 46 (and others) are used as the input to controller 70 on board helicopter 14 which drives actuators 18 and 20. The reason is that the signal from accelerometer 10 depends not only on the vibrations emanating from source 12, but also on the contribution from actuators 18 and 20 affecting the vibrations emanating from source 12.

In this invention, however, a correction subsystem which is a component of controller 70 uniquely estimates the output of sensor 10 in the absence of canceling vibrations caused by actuators 18 and 20 and, in response, provides a corrected output signal representative of only the vibrations emanating from the source of vibrations 12.

This aspect of the subject invention, wherein accelerometer 10 is placed right on the gear box of helicopter 12 and the correction subsystem which analyzes the actuators and estimates the output of accelerometer 10 in the absence of canceling vibrations imparted by the actuators, greatly simplifies the computations required to more effectively cancel vibrations and, in some cases, can eliminate the need for any other accelerometers on the structure to be isolated from vibrations.

As delineated in the Background section above, prior art vibration control systems were designed based on the assumption that the driving forces that produce the vibrations are periodic, i.e., comprising one or more steady sinusoidal behaviors that are summed together.

The truth is that for many systems, particularly helicopter 14, FIG. 1, the driving forces are low dimensional and chaotic, i.e., deterministic but inherently unstable.

Accordingly, in this invention, a state space predictor is employed as part of controller 70. Its input is the corrected output signal from accelerometer 10 representing only the vibrations from source 12 and not the vibrations caused by actuators 18 and 20.

The state space predictor of this invention is modeled after the work of Abarbanel, H. D. I., Brown, R., Sidorowich, J. J., and Tsimring, L. S., "The Analysis of Observed Chaotic Data in Physical Systems," Reviews of Modern Physics, v 65, No. 4, pp. 1331–1392, October 1993; Abarbanel, H. D. I., Analysis of Observed Chaotic Data, Springer-Verlag, 1996; Rulkov, N. F., Tsimring, L. S., and Abarbanel, H. D. I., "Tracking Unstable Obits in Chaos Using Dissipative Feedback Control," Physical Review E, v 50, No. 1, pp. 314–324, July 1994; Abarbanel, H. D. I., Korzinov, L., Mees, A. I., and Starobinets, I. M., "Optimal Control of Nonlinear Systems to Given Orbits," Systems & Controls Letter, v 31, pp. 263–276, 1997; and Rhodes, C., Morari, M., Tsimring, L. S., and Rulkov, N. F., "Data-Based Control Trajectory Planning for Nonlinear Systems," Physical Review E, v 56, No. 3, pp. 2398 2406, September 1997. State space predictor 102, FIG. 2 determines the correct input signal to the actuators based on variations in the corrected output signal from accelerometer 10 to better control the deterministic chaotic vibrations from source 12.

Figure 2:
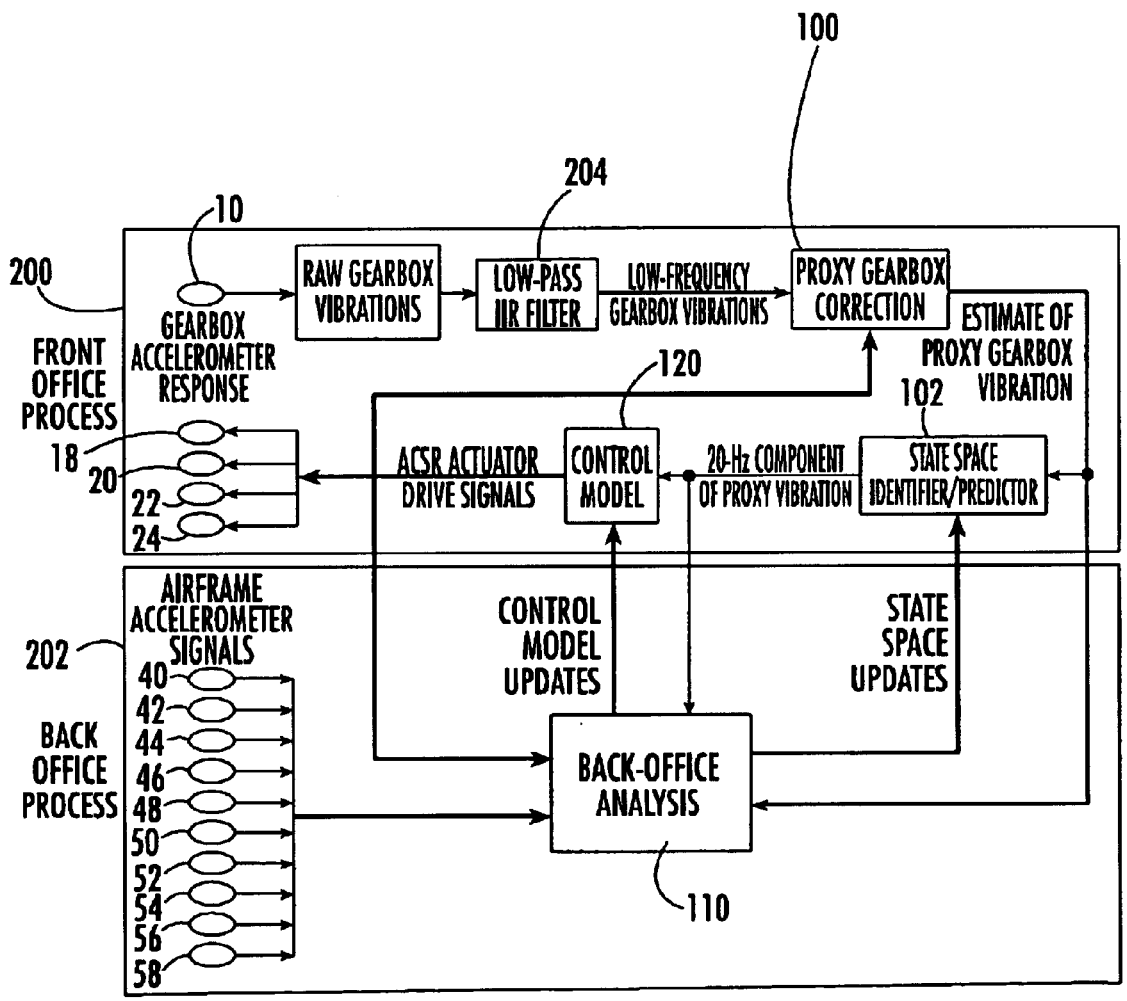
FIG. 2 is a block diagram showing the primary subsystems associated with the active vibration control system of the subject invention.

In FIG. 2 gear box accelerometer 10 is shown as are four actuators 18, 20, 22, and 24. Ten airframe accelerometers 40–58 are also shown but not required. Instead, the output of these accelerometers placed on the structure (here the airframe) to be isolated from vibrations are used for optimization only.

The correction subsystem of controller 70, FIG. 1 is shown at 100 as the proxy gear box correction block. The state space predictor is shown at 102. It is to be understood that both of these "components" are actually software programs operating on a processor as explained infra.

The subject invention is useful for actively damping any source of vibrations. The following disclosure, however, is directed to a specific implementation on a helicopter in order to show test results and one preferred embodiment of the subject invention.

Thus, the invention relates to the use of active control to reduce the vibrations in helicopters, but can be extended and applied to a broad range of additional applications, including vibration reduction in fixed wing aircraft, vibration control in mobile and fixed rotating machinery, and active noise control.

The broad concept of active helicopter vibration control is used in production helicopters by GKN Westland Helicopters, of Yeovil England. Further, active noise control is discussed extensively in the technical literature and is implemented in a modest number of practical applications.

Existing approaches to active vibration control typically comprise active isolation, in which actuators are applied to the equipment of interest and driven in such a way that the net vibration at one or more key locations is minimized. Any such control system must make certain assumptions about the nature of the driving forces that produce the vibration that is to be controlled. Typically, it is assumed that the driving force is periodic, i.e., comprising one or more steady sinusoidal behaviors that are summed together. If the driving force is actually this simple, the control problem is relatively simple, because the future evolution of the driving force is relatively predictable. One only need determine the influence of the control actuators on the equipment vibration response and optimize the actuator demand signals to minimize the resulting vibration.

The situation is complicated significantly when the vibration driving force is irregular, because the future driving force is not simply a delayed copy of an earlier driving force. Using the assumption of periodicity with such systems can result in significant control errors, limiting the extent to which the vibration can be reduced. The case of interest here is vibration driving forces that are low dimensional and chaotic, i.e., deterministic but inherently unstable. Because of their inherent instability, chaotic dynamics can only be predicted for short periods of time that are often sufficient for purposes of control. The inventions described here relate to the application of the methods of nonlinear dynamics to reduce structural vibration and/or noise.

Helicopter vibrations are chaotic and comprise a fundamental vibration at the blade passing frequency, plus several harmonics, all of which are modulated in amplitude in an irregular fashion. These vibrations are reasonably well behaved, in that they are low dimensional, can be predicted for short periods of time, have identifiable unstable periodic orbits, etc. In the prior art, "higher harmonic control" (HHC) was used to minimize vibrations. HHC is different from vibration isolation, in that the vibration is attacked at its source, the helicopter rotor, by "dithering" the swashplate of the rotor appropriately with each blade passing. However, HHC has been associated with damage to rotor hub components, and currently is not being pursued as a primary candidate approach for helicopter vibration control.

In Westland's Active Control of Structural Response (ACSR) system, the rotor assembly, comprising the rotor, hub, gearbox, and engines, is considered separate from the airframe of the helicopter. Actuators are installed between the rotor assembly and airframe, and driven in such a way as to minimize the transmission of vibration from the rotor assembly to the airframe. Multiple accelerometers (typically 10) mounted on the airframe monitor the vibration, providing a basis for control optimization. The existing ACSR system used in production helicopters utilizes an adaptive linear feed-forward control algorithm that basically assumes that the rotor vibration is a steady periodic. The subject invention employs dynamical analysis methods to enhance the performance of ACSR, largely as a software upgrade to the existing ACSR system.

The demonstration control system is illustrated schematically in FIG. 2. The overall control system is broken into two basic processes, the "front office process" 200 and the "back office process" 202. The front office process 200 is a highly efficient transaction-based process that is responsible for the instant-by-instant vibration control. Back office process 202 builds and modifies the settings for the front office process. Since the front office process is normally sufficient to provide desirable control accuracy with relatively fixed settings (proxy gearbox correction model, state space predictor model, and control model), the back office process does not need to work in real time. It is effectively more "contemplative", examining areas in which the system's performance departs from ideal, attributing the source of error, and updating the models as appropriate. Many aspects of the back office process are currently implemented in the existing ACSR algorithm. Still, the distinction between the front and back office processes is fundamentally different from the existing ACSR system, which integrates the functions of the front and back office processes into a single control process that operates at all times.

One novel aspect of the new control system is the use of accelerometer 10 mounted on the gearbox which serves as a "proxy" for the rotor vibration driving force. In the prototype control system, the actuator 18, 20, 22, and 24 demand signals are scheduled according to the vibration state estimated from this single-point measurement. A tri-axial accelerometer could also be used to monitor the rotor vibration in three orthogonal directions. This would allow tracking variations in the rotor vibration that occur in different flight conditions and during dynamic maneuvers. By contrast, the existing ACSR system monitors all 10 of the airframe accelerometers at all times to estimate the system condition.

The primary component of helicopter vibration occurs at the blade passing frequency, so the system illustrated in FIG. 2 is designed to minimize the airframe response at this frequency. This does not limit the concept to single-frequency control, as multiple-frequency control is an obvious extension of the technique. Further, arbitrary-frequency control should be feasible as well. The system predicts the blade-passing-frequency component of the rotor driving force a short period into the future, just long enough to permit implementing a suitable actuator forcing function. This prediction is performed using state space predictor 102, which uses several sequential values from the gearbox accelerometer 10 to find the current condition of the vibration in state space and estimate the corresponding vibration component. The resulting information is then used to generate the actuator demand signal that will cancel the vibration as well as possible.

Another novel aspect of this control system is the correction of the gearbox acceleration to determine the proxy rotor vibration. The vibration control actuators 18, 20, 22, 24 affect the gearbox vibration, so the observed gearbox response must be corrected to estimate what the vibration would be in the absence of control. This is generally feasible, because each combination of rotor vibration and actuator forces should have a reproducible effect on the gearbox vibration. In the most complicated embodiment, a nonlinear state space is used to determine the proxy vibration from the measured vibration and actual actuator demand signals. This state space is developed through earlier testing with various combinations of actuator forces and rotor vibrations. Desirable accuracy is also achieved using a linear correction. This involves subtracting the effects of each of the actuators from the observed gearbox vibration. The effects of the actuators on the gearbox vibration are determined from earlier tests, possibly during system startup prior to flight. In testing a prototype system it was discovered that the proxy correction, as described here, resulted in unstable control system operation. In computer simulations, it was revealed that this instability could be eliminated by ensuring that the actuator demand signals act exclusively at the blade passing frequency and by ignoring high-frequency components of the gearbox correction signal by low-pass filtering via filter 204.

Given the predicted vibration at the blade passing frequency, provided by state space predictor 102, there are numerous methods that can be used to determine the actuator drive signals to minimize the airframe response. The most sophisticated approach involves building a state space look up model that maps the vibration condition to the optimal actuator settings. This model is then be integrated into the state space predictor itself. On the other hand, a simple control matrix is usually sufficient to permit a level of vibration reduction that approaches the limit of controllability of the actuators and the airframe. Between these two levels of sophistication is a control matrix whose coefficients are a function of the amplitude of the rotor vibration. This improves the vibration reduction when the airframe response is more nonlinear, but where the fully non-linear state space model is not called for.

Figure 3:
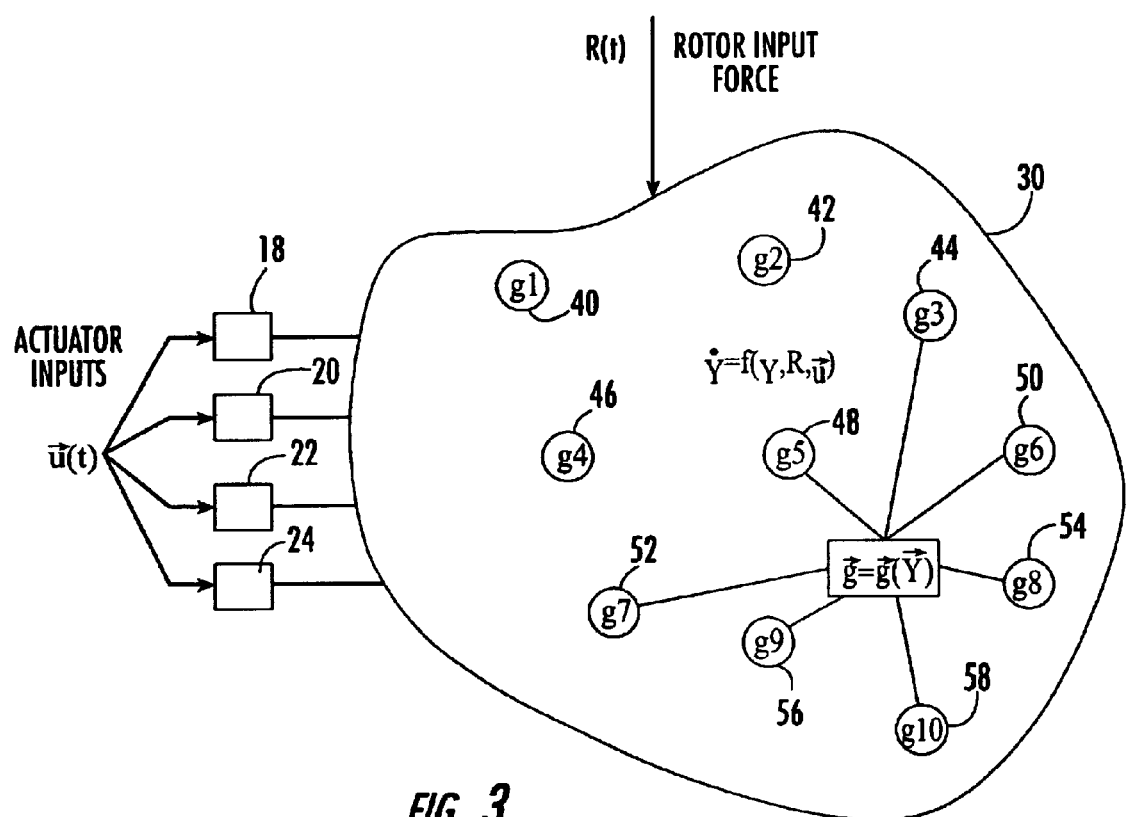
FIG. 3 is a diagram showing how the helicopter airframe vibrations are non-linear in accordance with the subject invention.

As shown in FIG. 3, the airframe 30 is viewed as a body that maps the driving forces acting upon it to the responses of the accelerometers 40–58 mounted on it. The airframe state is Y, and its time derivative is a function f of the rotor forcing function R(t) and several actuators 18, 20, 22, and 24 u(t). The response of the accelerometers is a function g of airframe state Y. The functions f and g are initially assumed to be arbitrary with no assumption that the effects of the rotor driving function and actuator inputs in any way additive. Thus, $$Y = f(Y, R, \bar{u}) \text{ and} \quad (1)$$

$$g = g(Y) \quad (2)$$

Figure 4:
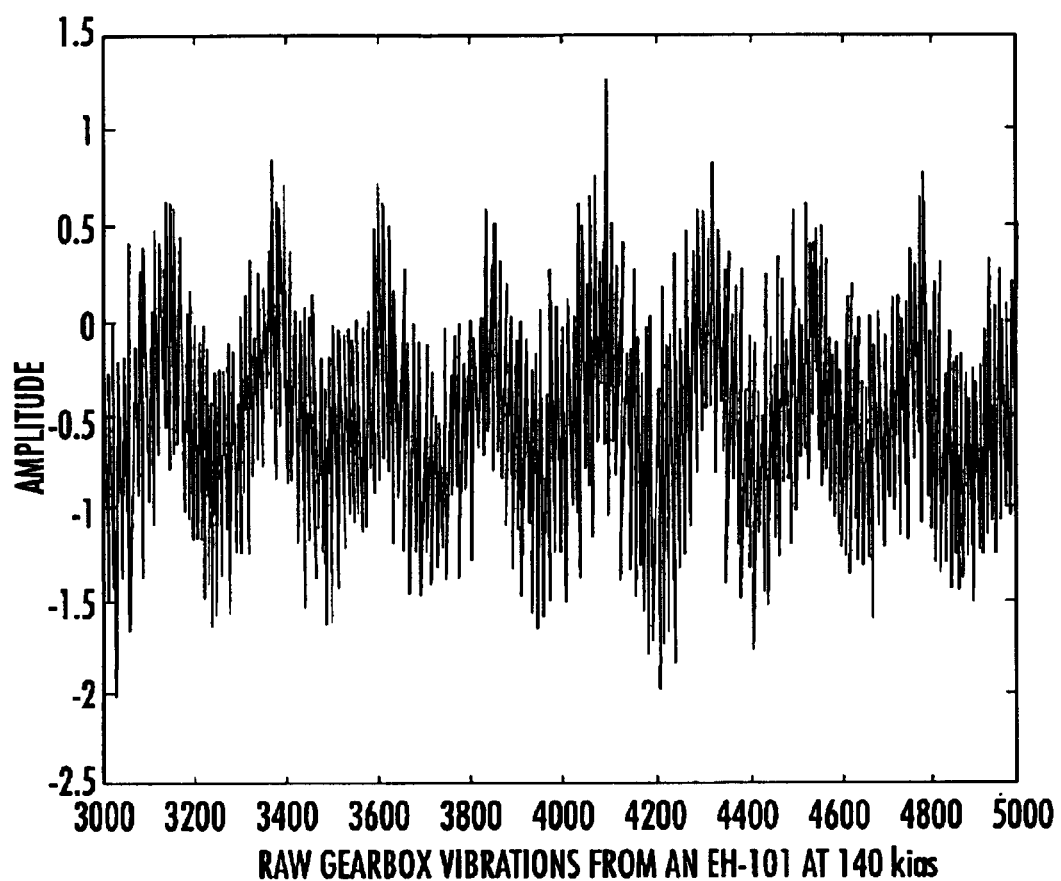
FIG. 4 is a graph showing the raw gear box vibrations data from an EH-101 helicopter at 140 kias.

FIG. 4 shows raw time series data that were recorded for the vertical vibration of the gearbox of an EH-101 helicopter using the output for accelerometer 10, FIGS. 1–2. This particular flight condition, level flight at 140 kias (knots indicated airspeed), is considered the nominal high speed cruise condition for the EH-101, and is typical of many mission profiles. These data were collected with the prior ACSR system turned off i.e., with no vibration control. Note the vertical scale of FIG. 4 is arbitrary. These data were collected at a nominal 4096 Hz, which actually corresponds to exactly 1170.25 samples per rotor rotation. Since the rotor rotational speed is not exactly constant, the sampling is synchronized to rotor position.

The blade passing frequency is the large-scale low-frequency behavior visible in FIG. 4. In addition to this behavior and behaviors at several harmonics of this fundamental, there are very strong high-frequency behaviors that are produced by the engines, gearbox, and attached accessories. These behaviors all occur at frequencies above 200 Hz, while the blade passing frequency is about 17.5 Hz. Thus, even allowing for several harmonics of the blade passing frequency, there is at least an octave between the rotor dynamics and the high-frequency behaviors seen in FIG. 4. In principle, it should be possible to build state spaces from these raw vibration data that can be used for all purposes of prediction and control. In practice, however, it is not practical to do so. The reason for this is that the time delay used in state space reconstruction must be smaller than the smallest period of an important behavior in the data. For these data, this would correspond to a delay of 1 msec or less. A large number of dimensions would be needed to build an unambiguous state space using such a short time delay, greatly increasing the computational complexity of performing prediction and control. Consequently, it is far preferable to eliminate these high frequency behaviors from the data before using them in state space analysis.

There is a strong prejudice within the nonlinear dynamics community against filtering data, and largely for well-founded reasons. Fundamentally, there is a desire to avoid changing the dynamics of the data to suit an incorrect prior assessment of their nature. In this case, however, there is no reason to believe that the high-frequency dynamics are related to the rotor dynamics (except by the fixed gear ratios between them), so there should be no problem filtering them out.

There are two broad classes of filters that can be applied: finite impulse response (FIR) and infinite impulse response (IIR) filters. The output of an FIR filter comprises a weighted moving average of the input:

$$y_i = \sum_{j=0}^{N-1} b_j \cdot x_{i-j} \quad (3)$$

A given output value depends solely on N input values (the filter window size), so an arbitrary behavior occurring in the input data persists in the output data for a finite period of time. Given the filter coefficients, the output vector, and a set of initial values for the input vector, the input vector can be reconstructed with some accuracy. Thus, an FIR filter does not really "kill" the dynamics it filters out, but instead "mushes them" into other frequencies. Nonlinear dynamicists normally prefer FIR filters for this reason, because they do not want to tamper with the dynamics naturally occurring in the data. By contrast, this is not desirable with the gearbox vibration data, since we simply want to ignore the high frequency behaviors.

By contrast, IIR filter 204, FIG. 2 is a bit more complicated:

$$y_i = \frac{\sum_{j=0}^{N-1} b_j \cdot x_{i-j}}{\sum_{k=1}^{M} a_k \cdot y_{i-k}} \quad (4)$$

In this case, the output vector depends on both recent values of the input data and on recent values of the output vector. Being auto-regressive, the response of an IIR filter to a given behavior in the input data persists forever (thus its designation as infinite impulse response). By virtue of its autoregressive nature, having the filter coefficients, the output vector, and a finite amount of information about initial conditions of the input vector does not permit an accurate reconstruction of the input vector. Thus, IIR filters really do "kill" the behaviors they reject.

Figure 5:
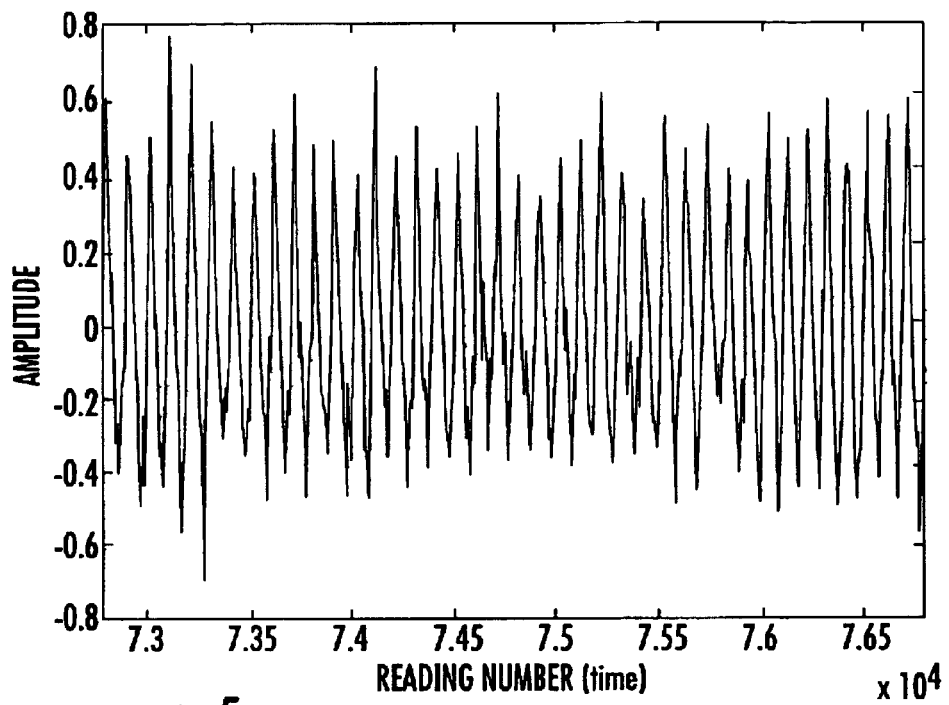
FIG. 5 is a graph showing the vibrations of FIG. 4 after they are filtered and resampled.

FIG. 5 illustrates the results obtained by filtering the data of FIG. 4 with low-pass IIR filter 204, FIG. 2. This clearly eliminated the high-frequency behaviors. FIG. 5 also reflects the resampling of the FIG. 4 data to a different time base. The EH-101 helicopter has a blade passing frequency of approximately 17.5 Hz, while the Westland 30 on which the ACSR test rig is based has a frequency of about 22 Hz. In order for the test rig results to approximate a direct "apples to apples" comparison, the blade passing frequency of the EH-101 data is sped up. Rather than increasing it to 22 Hz (which would necessitate a fair amount of bookkeeping for the remainder of the program), 20 Hz was used. Thus, the data in FIG. 5 were resampled to a 2 kHz sampling rate with a 20 Hz blade passing frequency, or 100 samples per blade passing.

Figure 6:
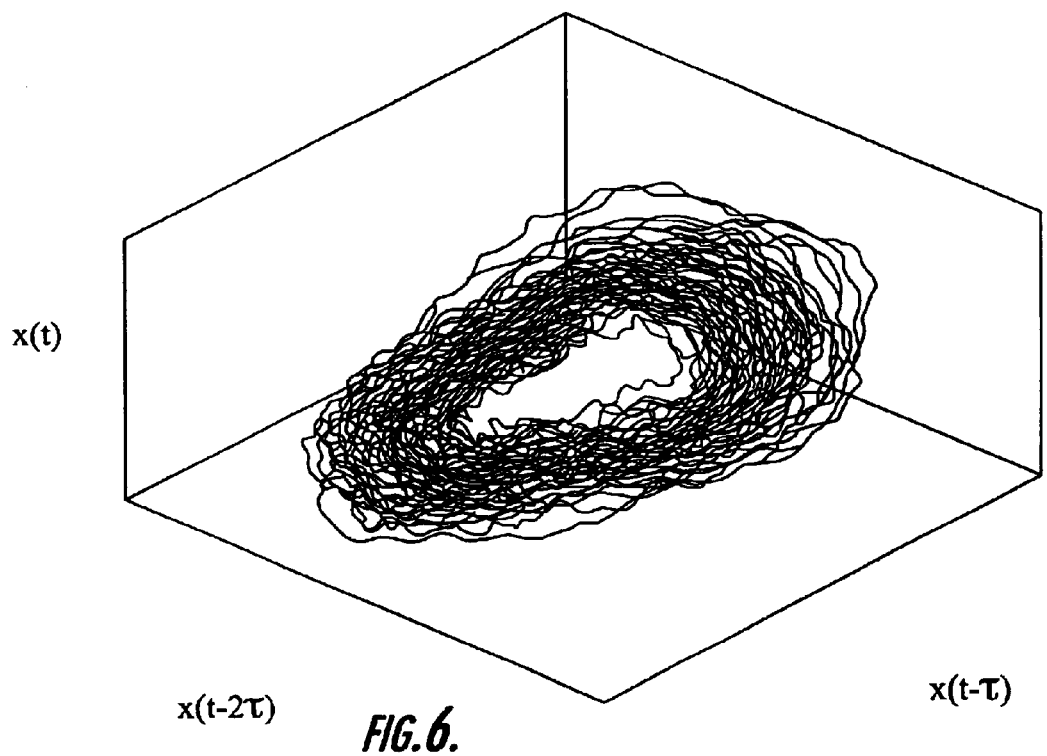
FIG. 6 is a view of a state space reconstructed from the vibration data of FIG. 5.

FIG. 6 shows a 3-dimensional reconstruction of the data in FIG. 5. This reconstruction used 5 sec of data (10000 points at 2 kHz) and a reconstruction time delay of 6 msec. As the figure shows, the blade passing frequency behavior is clearly dominant, being responsible for the largely toroidal character of the attractor. In addition, there is a significant variation about this behavior, which typically would be characterized as noise. In fact, however, the variation is highly structured, with neighboring trajectories behaving quite similarly. This 3-dimensional graph of the attractor is not actually an unambiguous representation of the dynamics of the data. Although it is not obvious from the graph, there are many places in which trajectories cross. A false nearest neighbors analysis finds that the dynamics are not completely unfolded unless a 5- or 6-dimensional representation is used.

Figure 7:
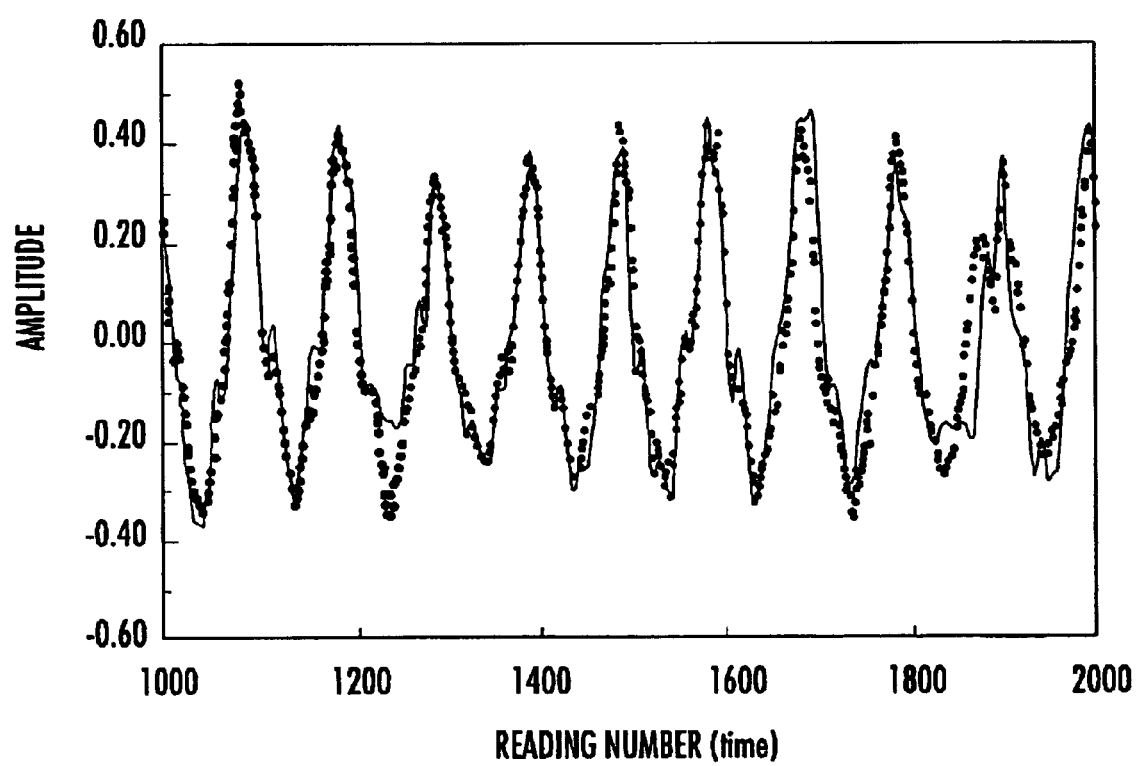
FIG. 7 is a state space prediction graph of the EH-101 vibration data.

In nonlinear dynamics, prediction is the key because a state space representation that does a good job of predicting new data must be a good representation of the dynamics. State space prediction works by identifying a set of points that are near a given point in state space, and characterizing how these points map forward with time. In many cases, particularly if the prediction time is short, it is possible to obtain good predictions using a linear mapping of the neighborhood forward in time. In this particular case, $$x(t+\tau)=x_0(t+\tau)+A\cdot(\vec{x}(t)-\vec{x}_0(t)) \quad (5)$$

where x(t) is current location of the point of interest, $x_0$ is the center of the neighborhood, and A is a vector found using a simple least squares analysis. This calculation is fairly simple, and clearly depends mostly on identifying a set of points that are near the point of interest. FIG. 7 shows the result of state space prediction of state space predictor 102, FIG. 2 for the data of FIG. 4. A state space was built using every sixth point of 15 sec of data, and then this state space used to predict the motion of points later in the dataset. The solid line of FIG. 7 represents the actual evolution of the signal, and the dots represent the predicted evolution based on the state space location of the system 25 msec (one-half blade passing) earlier. This is an ample prediction time to implement any required control algorithm. The prediction captures the character of the actual signal fairly well. In particular, it generally predicts changes in amplitude, a very important attribute for helicopter vibration control. It is occasionally fooled (e.g., the predictions around reading 1230), but quickly recovers and makes good predictions again. This is clearly a much better prediction than could be achieved through linear analysis.

In the preferred embodiment, the "k-d tree" algorithm is employed to build a database representing the state space as a tree with branches and sub-branches, etc. See Freidman, J. H.; Bentley, J. L.; and Finkle, R. A., "An Algorithm for Finding Best Matches in Logarithimic Expected Time," ACM Transactions on Mathematical Software, V3, No. 3, pp. 209–226, September 1977. At the end of each branch is a small box containing one or more data points. When it is desired to find the N points nearest to a given point, the algorithm looks first in the box corresponding to the state space location of the point to see if there are other points there. If so, checking the distance between those points and the given point is guaranteed to find several neighbors of the point of interest. At the same time, it is possible that points in neighboring boxes may be close to the point of interest, so neighboring boxes are also checked. In this way the algorithm can very rapidly identify a group of points that comprise the neighborhood around a given point of interest. This algorithm is enabling to the idea of real-time state space analysis.

Returning now to FIG. 2, the basic functions of the front office process 200 are to identify the rotor input force, identify the 20-Hz component (possibly some time in advance), and apply suitable demand signals to the outputs of actuators 18, 20, 22, and 24.

Although the gearbox vibration detected by accelerometer 10 is used as a proxy for the rotor input forcing function, the control actuators 18, 20, 22, and 24 produce forces that affect this vibration. The best way to account for this difference is to estimate what the gearbox vibration would be in the absence of control inputs, i.e., to correct the observed gearbox vibration to produce the gearbox vibration that is the best proxy for the rotor input.

The gearbox of helicopter 14, FIG. 1 is largely a rigid mass with respect to forces occurring at rotor input frequencies, so it is possible that the gearbox accelerometer 10 response can be viewed as a simple linear sum of responses to each of the input forces. It turns out that this is a pretty fair assumption.

Figure 8:
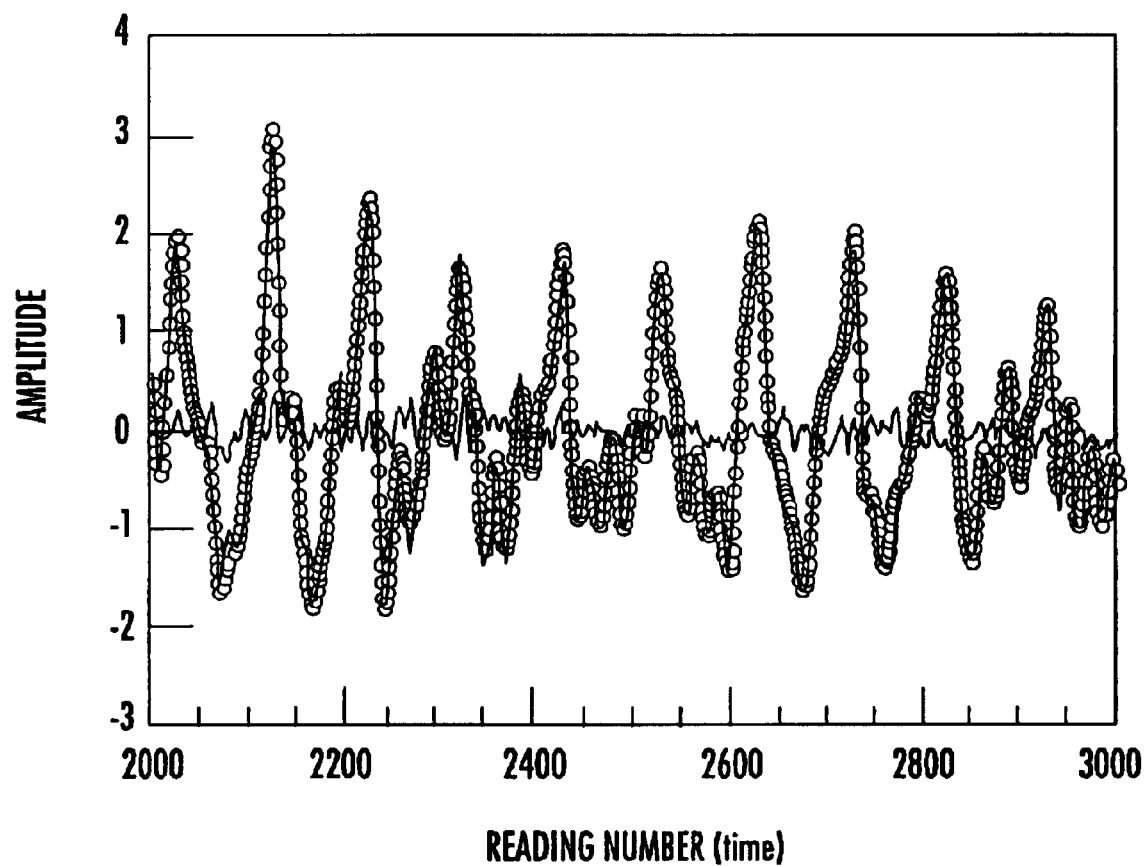
FIG. 8 is a graph showing a linear estimation of the proxy gear box vibration data in accordance with the subject invention.

FIG. 8 illustrates an example for tests with combined 20 and 60 Hz control of recorded flight vibrations. The points marked with circles represent the actual response to the head shaker input, i.e., the response without control that is the objective. The large amplitude solid curve is the estimated proxy gearbox vibration determined by proxy gear box correction subsystem 100, FIG. 2 by subtracting the response to each of the four ACSR actuators 18, 20, 22, and 24 from the response to all actuators. The small amplitude curve is the difference between the other two. The RMS error is 13.0 percent of the standard deviation of the actual vibration.

Figure 9:
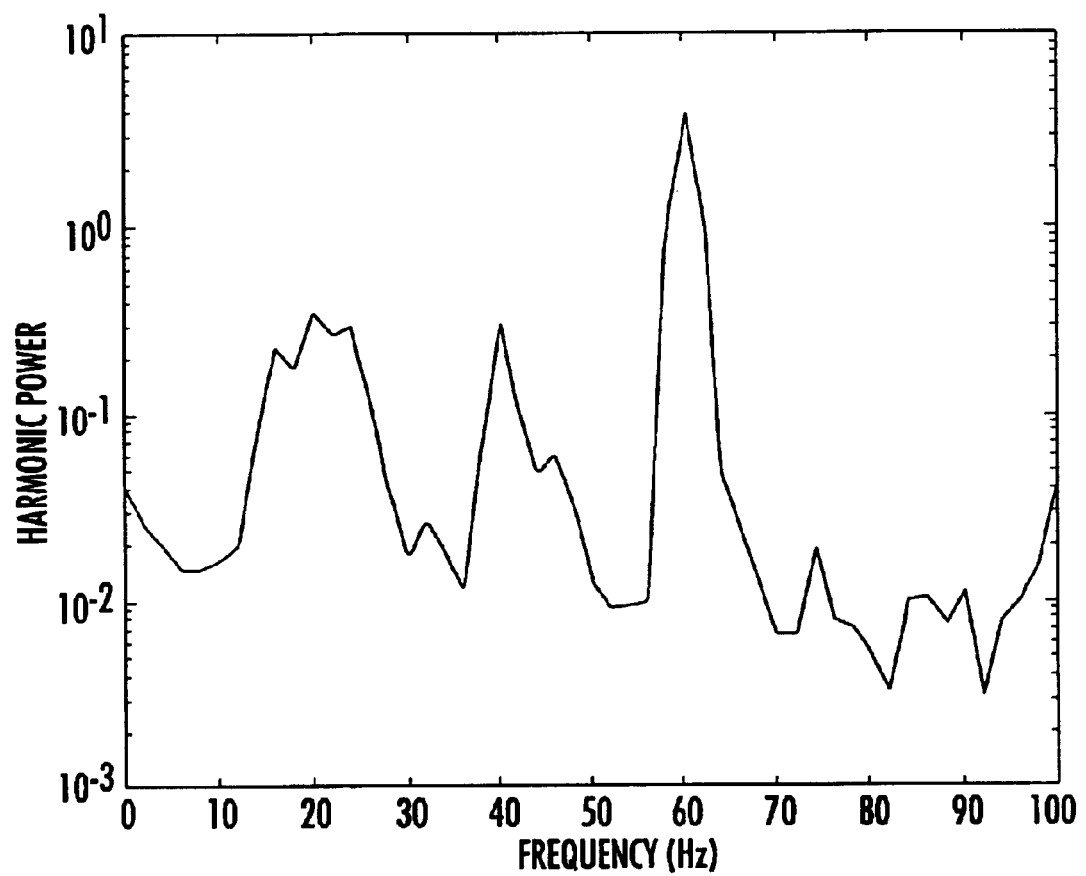
FIG. 9 is a graph showing the power spectrum of linear proxy gear box error.

This same RMS error is found for the tests with 20-Hz control of a sine wave. FIG. 9, a power spectrum of the proxy gearbox error for the 20-Hz control case, sheds additional light on this behavior. Frequencies above 100 Hz comprise 38.0% of the harmonic power of the error, and are not shown in the figure because they are filtered out. The bulk of the error is concentrated in frequencies around 60 Hz, comprising 43.1% of the harmonic power in the error. This is not surprising, since one might expect distortion effects in a 20-Hz sine wave to manifest themselves at 60 Hz. By contrast, the frequencies around 20 Hz and 40 Hz contribute only 11.4% and 4.6% of the harmonic power, respectively. Thus, if one were interested in identifying the 20-Hz component of the "proxy gearbox" vibration, an overall RMS proxy correction error of 13% would be reduced to an RMS error of 4.3% (i.e., $(0.114*(0.13)^2)^{0.5}$).

Figure 10:
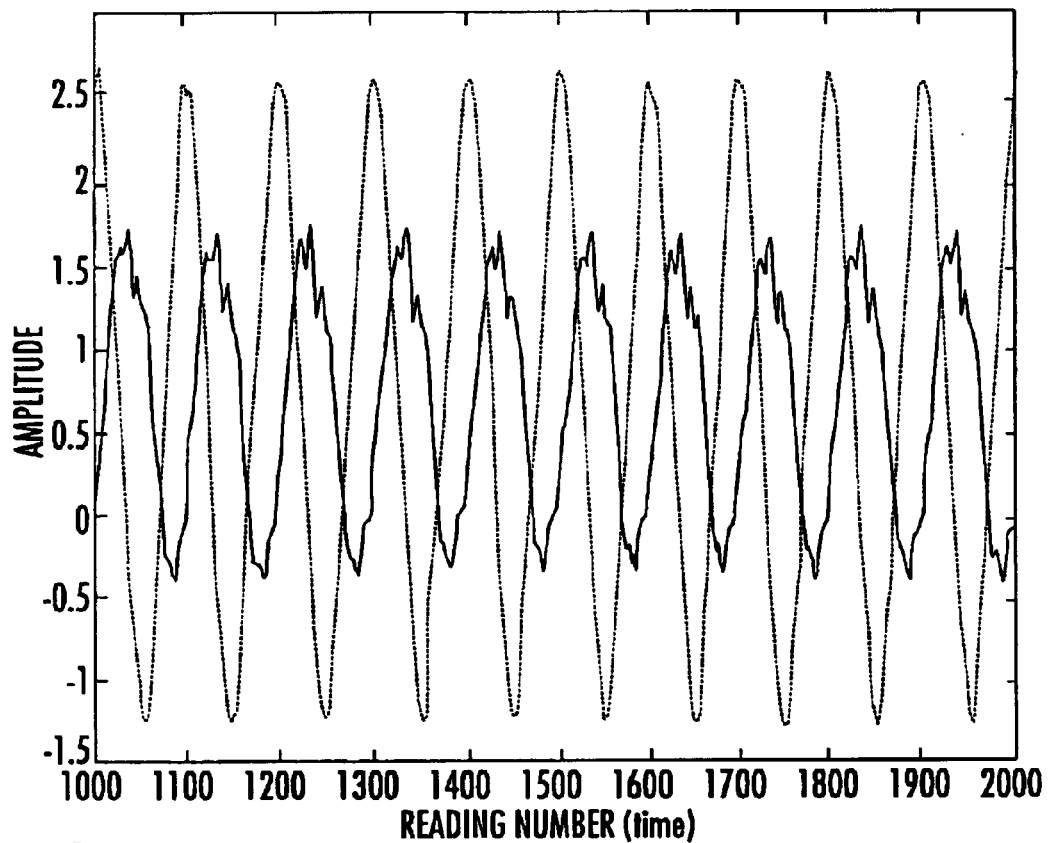
FIG. 10 is a graph showing gear box vibrations with and without the implementation of the control model of the subject invention.

Another aspect of proxy gearbox correction subsystem 100, FIG. 2 is the amplitude and phase relationships between the gearbox vibration with and without control, shown in FIG. 10. The gearbox response with control is of lower amplitude (by 48.0%) than without control, and lags the response without control by close to 60°. The amplitude and phase characteristics of the proxy gearbox correction can be important to the stability of using this correction in an on-line control system. That is, using the known actuator signals to correct the observed gearbox vibration to estimate the proxy gearbox vibration can affect the stability of the overall control system.

Figure 11:
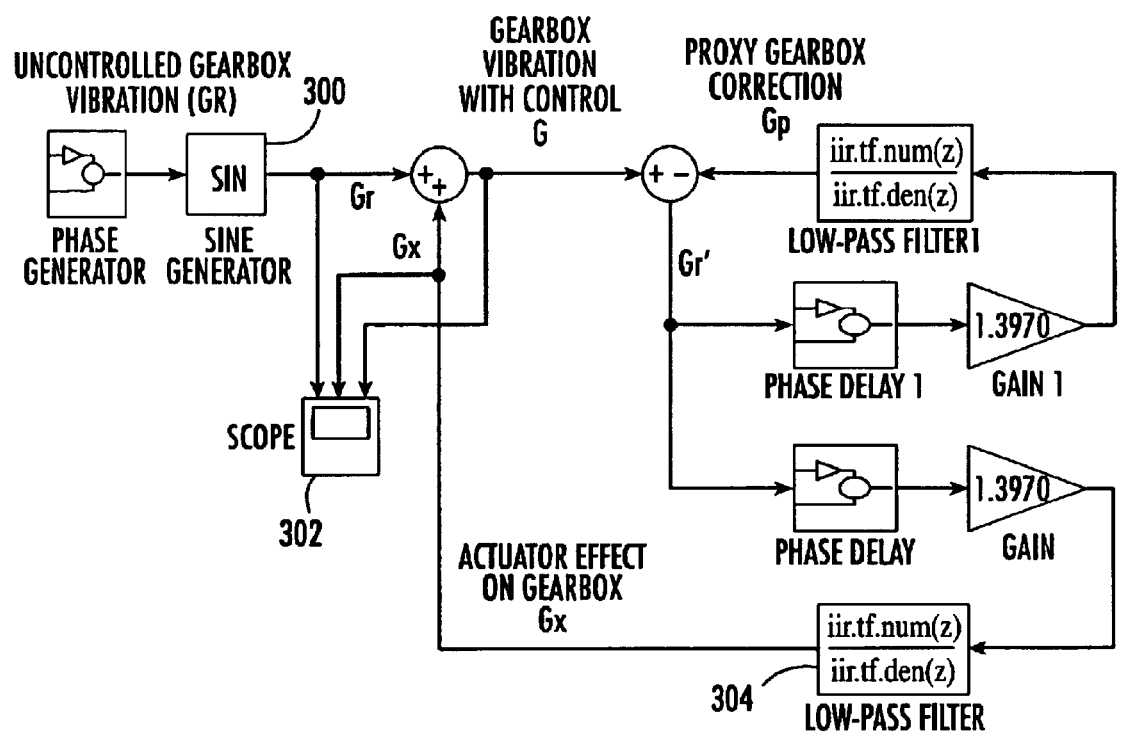
FIG. 11 is a Simulink block diagram for proxy feedback stability stimulation in accordance with the subject invention.

To examine the stability of the proxy gearbox correction subsystem in the context of a control system, a simulation of the process was performed using Simulink, an add-on to Matlab. Simulink permits simulations of dynamic systems to be constructed by connecting functional process blocks and running the resulting simulated system. FIG. 11 shows a schematic of the simulation used. The sine wave generator 300 represents the gearbox response to the rotor input force ($G_r$). $G_x$ added to $G_r$, is a model of the actuator influence on the gearbox vibration. The sum of these is the total gearbox response, measured with accelerometer 10, FIG. 2 is termed G. The three blocks in the upper part of the right side of the figure are a model of the proxy gearbox correction, called $G_p$. The scope block 302 on the schematic displays graphs of the key signals for quick confirmation of the system behavior.

The proxy correction is ideally identical to the effect of the actuator response model, so $G_r$ is very nearly equal to $G_r'$. Of course, it would not be an interesting case in terms of system dynamics if they were identical, because the system would be bound to be stable (unless the Simulink solving engine itself introduces instability).

The actuator influence and proxy gearbox models each comprise three blocks. The first block is a delay block, in which the output of the block is simply delayed by some number of calculation cycles. This models the phase effect of the actuator feedback (which is equivalent to a 198° phase lag of the actuator response following $G_r$). The gain block then applies a multiplier to this delayed signal, corresponding to the actual response gain found in the third test series. Equivalent results are obtained with an 18° phase lag and gain of opposite sign. The final block, low-pass filter 304 is important to stabilizing the control loop. This filter passes behaviors at the control frequency, but kills behaviors at higher frequencies. Without this filter, the simulation was fairly stable to differences between the amplitude gains of the actuator feedback and proxy correction blocks, but differences in the phase delays were always found to be very unstable. By adding the filters, the simulation was stable against significant errors in both the gains and phase delays. That is, errors in gain or phase delay in the proxy gearbox correction produced errors of limited amplitude and phase in the estimate of $G_r'$.

Implementing the proxy gearbox model in a real-time control system is accomplished using a simple matrix, $$\vec{G}_p = [T_1] \cdot \vec{X} \quad (6)$$

Here, $G_p$ is represented as a vector of the cosine and sine components (relative to the control system clock) of the proxy gearbox correction. The vector X is the vector of cosine and sine components of the actuator demand signals (4 actuators×2 components=8 rows, 1 column), and $[T_1]$ the proxy correction matrix (8 columns×2 rows). In a fully functional control system, the $[T_1]$ matrix is supplied by the back office process subsystem 110, FIG. 2.

State space predictor 102, FIG. 2 maps the proxy gearbox vibration $G_r'$ to the 20-Hz component of the same vibration, possibly with some prediction into the future to account for calculation and transport delays. It is built by back office process subsystem 110, and operated in real time by front office process subsystem 202.

The state space analysis comprises several fairly simple steps. First, a state space of time delay embedded $G_r'$ points is built associating the desired output (the 20-Hz component of the vibration) with each such point (a task for the back office process). Next, some number of nearest neighbors to a given point of interest are identified. A linear estimation of these nearest neighbors is then used to predict the most likely value associated with the point of interest.

This calculation really is fairly simple, but there is a complicating catch: identifying the nearest neighbors to a given point in state space is a potentially daunting task. Although there are numerous algorithms one might consider using, the k-d tree is generally accepted as the optimal state space search algorithm. A k-d tree is a way of representing the points in a state space in a tree-like structure, generated in accordance with the location of points in state space. The routines in the form of DLL files callable from any Windows programming language, MEX files callable from Matlab, and S-files callable from Simulink.

These predictors were used to examine a variety of issues related to the performance of the prototype control system. There are several variables that affect the accuracy of state space prediction: The embedding time delay; the embedding dimension; the number of points used in building the prediction state space; and the prediction time (i.e., amount of time in advance that a value is predicted).

Figure 12:
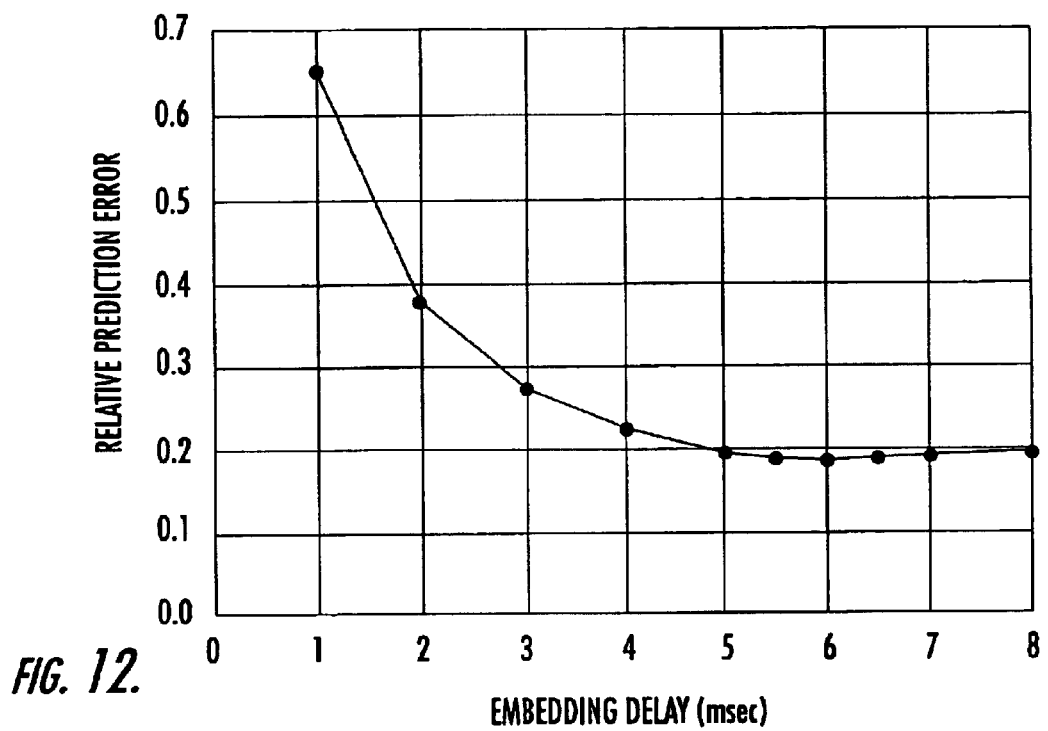
FIG. 12 is a graph showing the effect of embedding delay on prediction error in accordance with the subject invention.

An examination of the influence of each of these variables on prediction accuracy, yielded generally favorable results. In most of these analyses, the standard EH-101 flight data was used, low-pass filtered and resampled to a 20-Hz blade passing. The embedded vibration data were used to predict the 20-Hz component of the data some period of time in advance. This 20-Hz component was calculated from the time series data using a bandpass filter developed using Matlab's Signal Processing Toolbox. To eliminate any phase error, the filter was applied using a special algorithm, call "filtfilt", which runs the filter twice (once forward in time and once backward in time): this generates a 20-Hz waveform that is synchronous with the time series. The state space was built from 100,000 points sampled at 2 kHz. FIG. 12 shows the effect of embedding time delay on prediction accuracy for a 5-dimensional space predicting ahead 8 msec. The Y-axis is the relative prediction error, the RMS error divided by standard deviation of the predicted signal. As the figure shows, a delay of 6 msec proved to be optimal, although any value between roughly 5 and 8 msec provides nearly as good accuracy.

Figure 13:
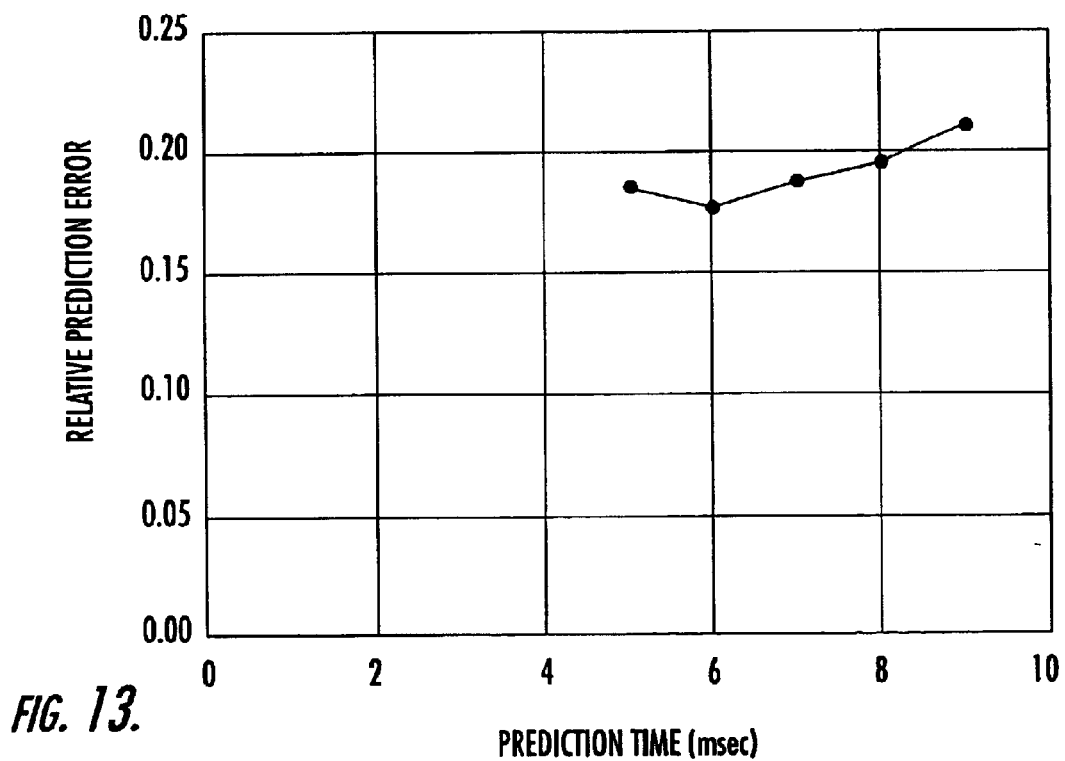
FIG. 13 is a graph showing the effect of prediction time on prediction error in accordance with the subject invention.

In practical terms, the control update rate, embedding delay, and prediction time would normally be linked. The control system would be expected to accept data at some rate (say every 3 msec), build the embedded state space location from every second value, perform a state space prediction, calculate the corresponding actuator settings, and output the result. Thus, the prediction time would probably be some multiple of the system sampling time. FIG. 13 shows the effect of embedding delay and prediction time, when prediction time is constrained to be an integer multiple of embedding delay using 5-dimensional state spaces. In principle, optimal accuracy with a prediction time of 6 msec could be obtained with 1, 2, 3, or 6 msec embedding delays, but the longest embedding delay always provided the optimal prediction accuracy. As the figure shows, the minimum prediction error was again obtained with a prediction time equal to embedding delay of 6 msec. Still, any of these prediction times would provide acceptable control accuracy, so limitations of the calculation rate of the real-time test bed computer could be addressed by adjusting the embedding delay and prediction time.

Figure 14:
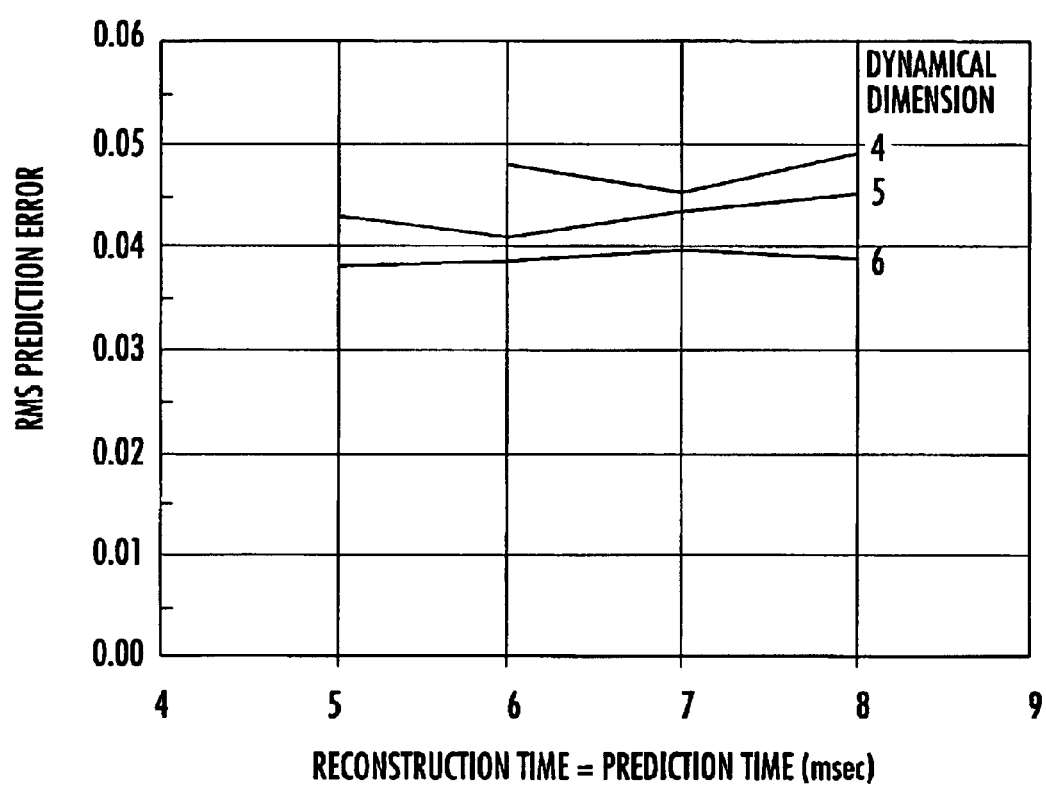
FIG. 14 is a graph showing the effect of embedding dimension on prediction error in accordance with the subject invention.

The next analysis examined the effect of embedding dimension on predictive accuracy. One would expect the prediction error to drop, in general, as embedding dimension rises, although using too high a dimension simply raises calculation time without being rewarded with improved accuracy. FIG. 14 presents the results that were obtained. In all cases, a 6-dimensional space produced the least error, although in some cases not significantly less than a dimension of 5. There was no point going to 7 dimensions, as the required computation time increases rapidly as dimension increases with little or no improvement in prediction accuracy. The smallest error was obtained for a 6-D space and 5 msec embedding/prediction time. Still, one might not choose to use this combination of settings, because both the update rate and dimension are relatively high: the combination selected for the demonstration should be made based on a combination of maximizing predictive accuracy subject to the capabilities of the control computer. For the real-time demonstration, we used a 6-D space and an embedding delay of 6 msec. It turns out that we could have used a shorter embedding delay without problems.

Figure 15:
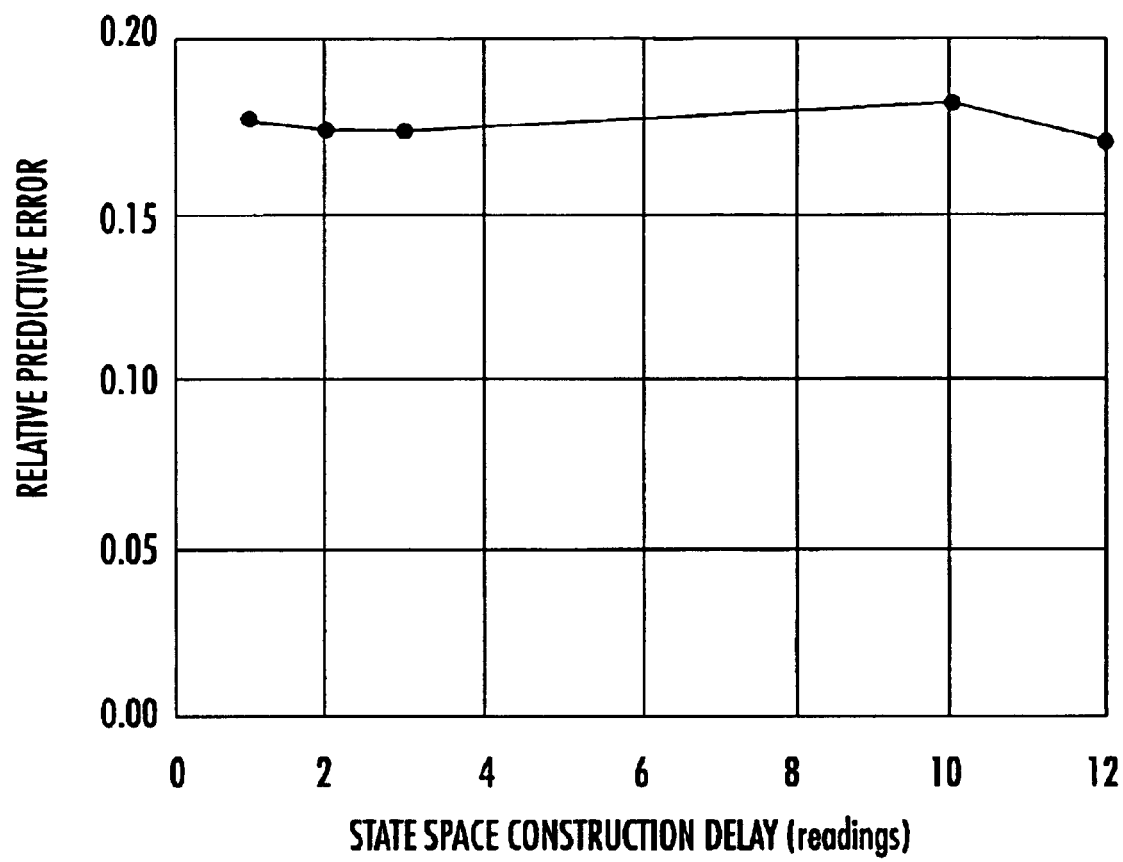
FIG. 15 is a graph showing the effect of reading interval in the state space on prediction error in accordance with the subject invention.

The next effect considered is the size of the space used to perform the predictions. There are actually several different issues. For example, given a time series with which to build the state space, how would skipping values affect the state space prediction error. FIG. 15 addresses this question. In this analysis, a 5-dimensional space was used and a 6 msec embedding delay. Skipping readings, at least for the range considered, had no clear-cut influence on prediction error. This means that the number of points in the state space, which has a first-order effect on calculation time, can be reduced at least to an effective sampling time equal to the embedding delay without loss of accuracy. The accuracy of these predictions was also not influenced by whether or not the state space was built of points sampled an integer number of blade passings earlier or later than the points that were predicted.

Figure 16:
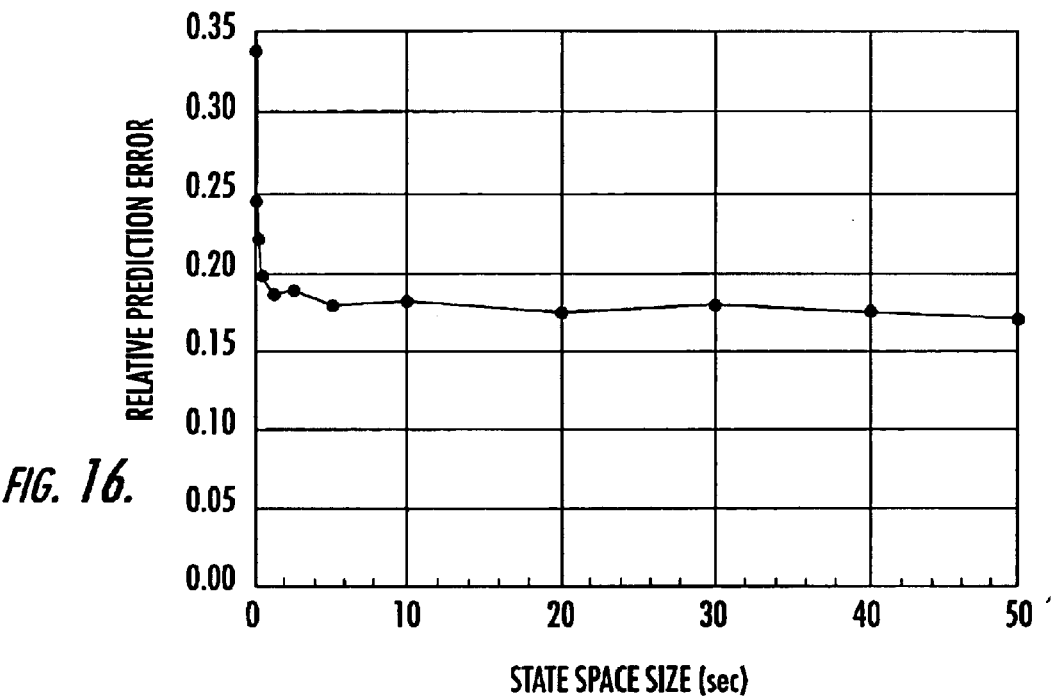
FIG. 16 is a graph showing the effect of state space size on prediction error in accordance with the subject invention.

The next measure of state space size is the period of time covered by the data used to build the space. Using a dimension of 5, and embedding delay and prediction time of 6 msec, we obtained the results shown in FIG. 16. This result is fairly impressive: improving accuracy beyond some level requires a large increase in the state space size, which probably is not worthwhile. A state space built of 1 sec of vibration data does nearly as well as a state space built of 10 sec of data.

Figure 17:
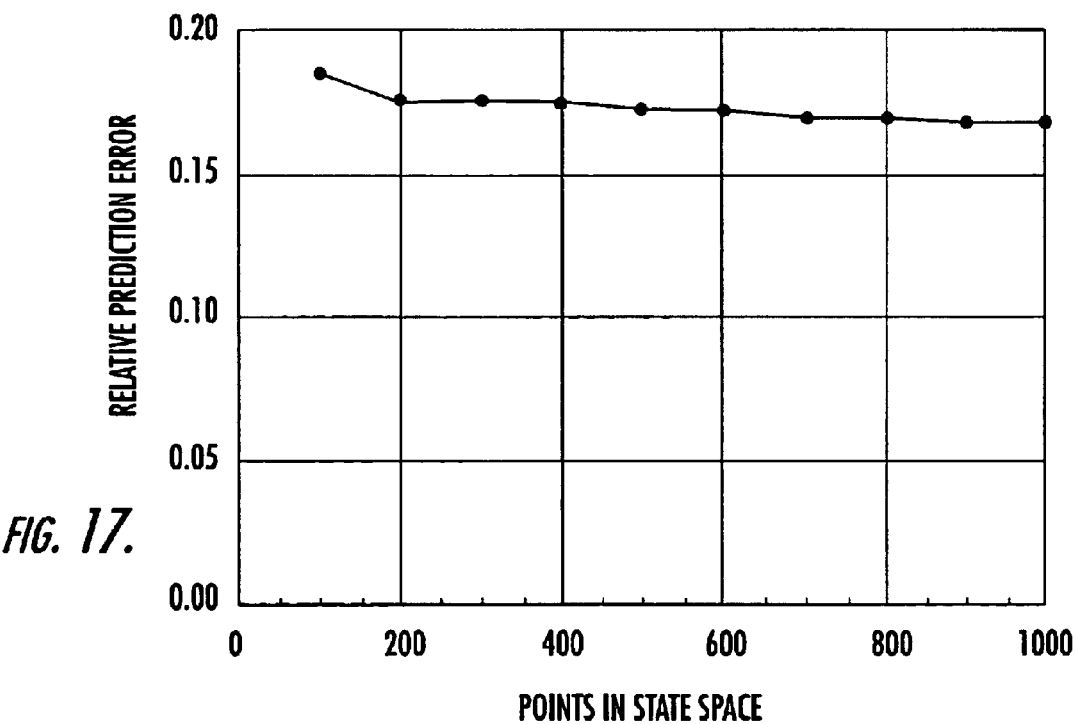
FIG. 17 is a graph showing the results obtained with the worst-predicted state space optimization in accordance with the subject invention.

This result only begs additional questions about how one might develop an optimal state space representation of a flight condition. One approach might be to build the space according to the worst-predicted behaviors. For example, we might start with a space of 50 points, nearly the minimum to get started. We could predict some block of data, determine which point in the block is predicted the least accurately, and add it to the state space. The rest of the data block is then predicted again, the worst point found and added to the space, and so forth. FIG. 17 shows the results obtained in predicting different data (not used in building the state space) as a function of state space size. This result is very interesting, because the accuracy achieved with even the smallest group of data is better than we had seen in other analyses.

Westland data for five different flight conditions is described in Table 1.

TABLE 1

| Condition Designation | Flight Condition | Standard Deviation (After resampling/filtering) |
|---|---|---|
| c2 | 40 knots | 0.5031 |
| c5 | 100 knots | 0.2049 |
| c7 | 140 knots | 0.6130 |
| c11 | 120 knots, left turn | 0.2451 |
| c13 | Flare to hover | 0.2825 |

Two of these conditions, (c11 and c13) correspond to flight transitions (a left turn at 120 kias and a flare to hover, respectively), and are not predicted well using state spaces constructed from vertical vibration data. The reason for this is that these flight conditions involve large off-vertical excursions in the vibration, so a Z-axis accelerometer is not sufficient to describe the dynamics. In particular, a flare to hover is a violent maneuver, so the low Z-direction standard deviation is not representative of the overall aircraft vibration level. This raises an important point that must be considered in the practical implementation of the resulting control system in flying aircraft: it is likely that the state space must be constructed using multi-axis accelerometers (probably 3-axis, but potentially 6-axis, including rotations). This may require a higher-dimensional state space, but presumably not an 18-dimensional one, since there should be a lot of redundant information in vibrations in orthogonal directions.

Having three flight cases that are amenable to state space analysis, a state space using 200 points from each flight condition (selected using the "worst-predicted" criterion), was built and used to predict other points in each data set. The results obtained are presented the table 2 below showing that the level of error for the multiple-condition state space is modestly higher than for individually constructed spaces. The relative error for case c5 is misleadingly high, because the vibration level in this case is quite low. Consequently, the actual RMS error levels are more enlightening for these cases. These results indicate that there is a good chance of obtaining a desirable level of control using a single state space to model multiple flight conditions.

TABLE 2

| | Single-Condition State Space | | Multi-Condition State Space | |
|---|---|---|---|---|
| Condition | Relative Error | RMS Error Level | Relative Error | RMS Error Level |
| c2 | 0.0902 | 0.0196 | 0.0971 | 0.0211 |
| c5 | 0.2344 | 0.0153 | 0.2900 | 0.0189 |
| c7 | 0.1756 | 0.0403 | 0.1889 | 0.0433 |

The foregoing has answered many questions of practical importance to a nonlinear vibration control system. Clearly, the predictive accuracy achievable with state space analysis is not very dependant on the time delay, embedding dimension, or state space size, and multiple operating conditions could be represented using a single state space. There is also evidence that one could optimize the points selected for use in a state space predictor, maximizing the predictive accuracy achievable with a given level of computation. Still, one is left wondering what the "best" approach is to constructing a state space. One possibility is to combine a "library" of flight conditions, chosen carefully through some optimization scheme, that represents most operating conditions reasonably well. One could then supplement this state space by "washing" vibration data from recent experience (say, the last second of vibration) through the state space.

One attribute of a state space analysis that is not desirable for a flight vibration control system is that it cannot guarantee that the control output is identically at the blade passing frequency. That is, the 20-Hz vibration component predicted by a state space analysis is generally correct, but can contain behaviors at other frequencies, which one might call "state space noise". To obtain civil flight certification for the current ACSR system, the control outputs sent to the actuators are filtered to ensure that they were limited to the blade passing frequency. The basic reason for this was to limit the control authority of the system to an understood range of effects on the airframe. The output filters impose a 0.13-sec response delay on the actuator output. While burdensome to the existing ACSR system, such a delay would be extremely undesirable for a nonlinear control system. This is because the maximum prediction time for the flight vibrations is much less than 0.13 sec, so one might be no better off with the enhanced vibration control system than with the existing ACSR system. Consequently, alternative means of ensuring that the actuator signals were purely 20 Hz were pursued.

Two separate methods can be used to clean up the actuator outputs. The first method is to fit several recent values produced by the state space to a 20-Hz sine wave, and use the resulting sine wave to generate the output to the actuators. A simple analysis routine performs a least-squares fit of several values to a 20-Hz sine wave. As long as the number of points used to perform the fit covered at least ½ of a period, essentially uniform accuracy is obtained. The computation time associated with this analysis step is modest, and the prediction accuracy is actually improved (because the non-20-Hz components of the prediction are removed). This "filter" suppresses non-20-Hz behaviors by greater than 20 dB. After smoothing with the least-squares filter, the relative error in our best-predicted case with the 140 kias flight condition was reduced from 0.1756 to 0.1462. Thus, the RMS amplitude error for this important flight condition is less than 15%. The analysis proved that, given an ideal vibration reduction of 95% in cost, a 15% amplitude error should produce an actual cost reduction of 93%, for an RMS amplitude reduction of 73.3%. This is 94% of the 77.6% amplitude reduction possible with an ideal state space controller, a very favorable result. This least-squares 20-Hz "filter" was used for the demonstration control system.

One disadvantage of the least-squares filter is that, like any filter, it introduces a delay to updates of the 20-Hz signal, in this case of roughly ½ period (25 msec). Consequently, for maximum vibration control accuracy, the predictor should predict the 20-Hz behavior ½ period ahead, in addition to any other prediction times required for analysis and transport.

Another disadvantage of the least-squares filter is that it suppresses spurious non-20-Hz behaviors fairly effectively, it does not guarantee that the actuator output signals are identically 20-Hz. In particular, if the proxy gearbox correction is not stable, the least squares filter will permit other frequencies (at least in the range of 12–30 Hz) to survive to the actuator outputs. Although stability of the proxy gearbox should not prove to be a problem in a flight version of the system, there is a risk that an unforeseen instability could affect the control authority of the controller, which could prove unacceptable for flight certification. Consequently, it seems prudent to pursue a different approach in the long run.

The main alternative approach is to use the state space to predict the amplitude of the 20-Hz component of the vibration, rather than the instantaneous value of the 20-Hz component. This amplitude is then used to drive 20-Hz oscillators for each actuator, ensuring that the actuator outputs are identically at 20 Hz. Interestingly enough, using the state space to predict amplitude actually improves prediction accuracy modestly: without smoothing the predictions, the relative prediction errors were only 12.7%, compared to previous errors of 17–20%. Suitably smoothing the result (e.g., a trended moving average) would be expected to improve the overall prediction accuracy. This approach gives up the freedom to vary the phase of the actuator inputs rapidly, but this is not a problem, because the phase of the rotor driving force varies modestly with time. If one simply assumes a fixed phase offset for the rotor driving force that is equal to the long-term average value, we find that the average signal error is 11.1%. When the amplitude and phase errors are combined, the net result is an overall prediction error of 16.9%, consistent with the results obtained for detailed prediction of the 20-Hz signal. Consequently, the control system does not need to provide rapid update to the actuator phase angles. In fact, an estimate of the phase angle of the rotor driving force could be maintained by the back office process, and injected into the front office process on an occasional basis. To limit control system authority, it would be a simple matter to limit the rate and size of updates to this rotor phase estimate. If necessary, a watch dog process could cut off the actuator outputs in the event that they include frequencies outside an allowable band.

The other major function of the front-office process is to apply the control model 120, FIG. 2 to produce the actuator outputs. The control model for the state space controller is actually simpler than that for the existing ACSR system. Since it uses the rotor component of the gearbox vibration as a proxy for the rotor driving force, the actuator demand signals are found by a multiplication of a control matrix with the rotor component of the gearbox vibration:

$$\vec{X} = [A] \cdot \vec{G}_r \quad (7)$$

where $[A]$ is the control matrix, $\vec{G}_r$ a vector of the cosine and sine components of the rotor component of the gearbox vibration, and X a vector of the cosine and sine components of the actuator demand signals. This approach works very well, and the matrix representation offers a significant advantage in optimizing the control matrix. In principle, the coefficients of $[A]$ should vary with the amplitude of both the cosine and sine components of $G_r$, since the airframe response is somewhat nonlinear. It is likely that simply accounting for the amplitude of $G_r$ would be sufficient to correct for this nonlinearity (although we did not specifically investigate this in testing). Still, the control accuracy achieved with a fixed $[A]$ matrix was good enough that the added complexity of using a variable matrix does not seem warranted. Consequently, the demonstration system used a fixed control matrix, which would be provided by the back office process in a fully operational control system. The process of estimating and updating the control matrix would be performed by back office 110, FIG. 2.

Back office process 110 is not involved in instant-by-instant vibration control, but instead makes, checks, and updates the settings required by the front office process. In a sense, it is more "contemplative" than the front office process, in that it can afford to examine phenomena over a period of time to optimize the results. The basic tasks of the back office process include the following: generating the proxy gearbox correction matrix, generating and update the actuator control matrix, generating and modifying the state space prediction model, and performing system diagnostics.

The existing prior art ACSR system performs at least one of these functions already, generating and modifying the actuator control matrix. The system of this invention also determines to what extent the current source of control error is a function of errors in the control matrix or the state space predictor, and then take appropriate corrective action.

The current ACSR system performs a simple test prior to flight, in which each actuator is driven in sequence with a 20-Hz sine wave to determine the impact on the airframe-mounted accelerometers. The resulting actuator response matrix is then used to calculate the first estimate for the control matrix. The system of this invention could perform this test as well, at the same time determining the influence of each actuator on the gearbox accelerometer, generating the proxy gearbox correction matrix. In all likelihood, the actuator response matrix and proxy correction matrix hardly change over time, so there is no reason that these matrices could not be carried over from one flight to the next. In fact, it seems reasonable to compare the current and past values of these matrices as a check on the condition of the control system.

The proxy correction matrix does not need to be updated during control system operation, since there is no reason to believe that it should vary significantly. In addition, as was described above, the control matrix can accommodate errors in the proxy gearbox correction model. This is fortunate, since it could prove to be difficult to differentiate between errors in the proxy gearbox correction model and the control model.

As the helicopter flies, the current ACSR system continually checks the response of the airframe accelerometers to update the control matrix and schedule the actuator demand signals for the next rotor rotation. This task is relatively simple, because the assumption is made that the rotor input is constant. In the system of this invention, the rotor input is not constant, and the control model is more nearly static as flight conditions change. The proportionality between the proxy gearbox vibration and actuator inputs ensures that large changes in the control model will not be needed, so updating the control model will occur more occasionally and with smaller incremental changes than with the current ACSR system.

The process of updating the control model involves comparing the actual 20-Hz component of the proxy gearbox vibration and actual actuator inputs with the anticipated response of the accelerometers, and correcting the control matrix to minimize the overall cost function. Since a very similar version of this process is already implemented in the existing ACSR system (and performed at an update rate far higher than would be needed in our nonlinearly enhanced version), there is no question about the feasibility of performing this process in a flight version of the control system.

The other major control-related function of the back office process 202, FIG. 2 is to generate and update the state space model that maps the proxy gearbox vibration to its 20-Hz component. The process of checking the suitability of the current state space includes back office process 202 monitoring the proxy gearbox vibration used in the front office process and compare the state space prediction with the actual 20-Hz vibration component of the data. The state space model does this in real time, probably with some level of prediction involved. The back office process can calculate the 20-Hz component using a digital filter. When a significant level of error is detected in the current state space model, the back office process could inject a new state space model for the front office process to use.

The final function of the back office process is to monitor the operating condition of the control system itself. This would involve monitoring the status of each of the accelerometers, which have diagnostic circuits built in, and similarly comparing the actuator demand signals with the actuator feedback signals to the servo amplifiers. If problems arise, the back office process could log them for attention during aircraft maintenance. Beyond this, there is an opportunity to use the back office process to monitor the dynamic performance of the control system. For example, the proxy gearbox correction model, control model, and state space models all could be carried forward from one flight to another. If there is significant variation in any of the models, this could signal a change in the rotor condition or the structural condition of the airframe.

The real-time demonstration system was developed using Simulink, a Matlab add-on, using a notebook computer belonging to Westland. The resulting control system algorithm was then downloaded to Westland's DSPace controller. The DSPace controller is a computer plug-in card that uses a Texas Instruments TMS320C40 DSP processor to control operations related to obtaining input from data acquisition channels, producing output to control channels, and perform data processing in real time. It is mounted in an Autobox backplane computer, which is connected by ethernet cable to the Simulink development computer. The system is quite capable, as it easily hosts an implementation of Westland's existing ACSR algorithm.

The principal technical hurdle involved in implementing the nonlinearly enhanced controller on the real-time test bed proved to be making state space predictor 102 work in the context of the combined Simulink/DSPace compiler. The basic state space predictor code, written in C, had been successfully made to work as stand-alone Windows programs, a DLL that could be called from any Windows programming language, and a MEX file, a special DLL that can be called from Matlab. To work on the DSPace system, the code had to be modified further to work as an S-function, a special DLL format for use with Simulink.

Although making these modifications was straightforward and succeeded in making the predictor work with Simulink on a regular PC, this was not sufficient to make the code work on the DSPace system. The reason for this is that the compiler for the DSPace system does not support the same memory allocation and cleanup functions of standard C, so that calls that work properly on a PC would not work on the DSPace system. To further aggravate the situation, the DSPace compiler has essentially no debugging tools built in. Consequently, the code was debugged virtually line-by-line, by inserting error flag statements in the code, compiling it and downloading it to the DSPace system, and finding which error flag terminated execution. Each compile/download cycle required 10 to 15 minutes.

The state space predictor makes predictions using polynomial fits of several nearest neighbors to the point of interest. The order of the polynomial that is used can be set as desired by the user. Typically, we use a first-order fit, i.e., a linear model of the neighborhood, as this provides very good prediction accuracy with a modest computational burden, but quadratic or cubic models can be used if a state space has very complicated behavior. Predictor 102 was only capable of a 0-th order fit. It was clear that one ultimately could debug the code so that all prediction orders would work.

In a 0-th order fit, the prediction that is output is the average of the values of the several neighbors, with no correction for the location of the desired point relative to each neighbor. To test the effect of this limitation on prediction accuracy, two predictions were performed using EH-101 flight vibration data to predict the blade passing frequency component of the vibration. With a first-order fit, an RMS error of 16.5% was obtained. With a 0-th order fit, an RMS error of 19.0% was obtained. Thus, using the lower-order fit increased the prediction error by 2.5 percentage points.

Figure 18:
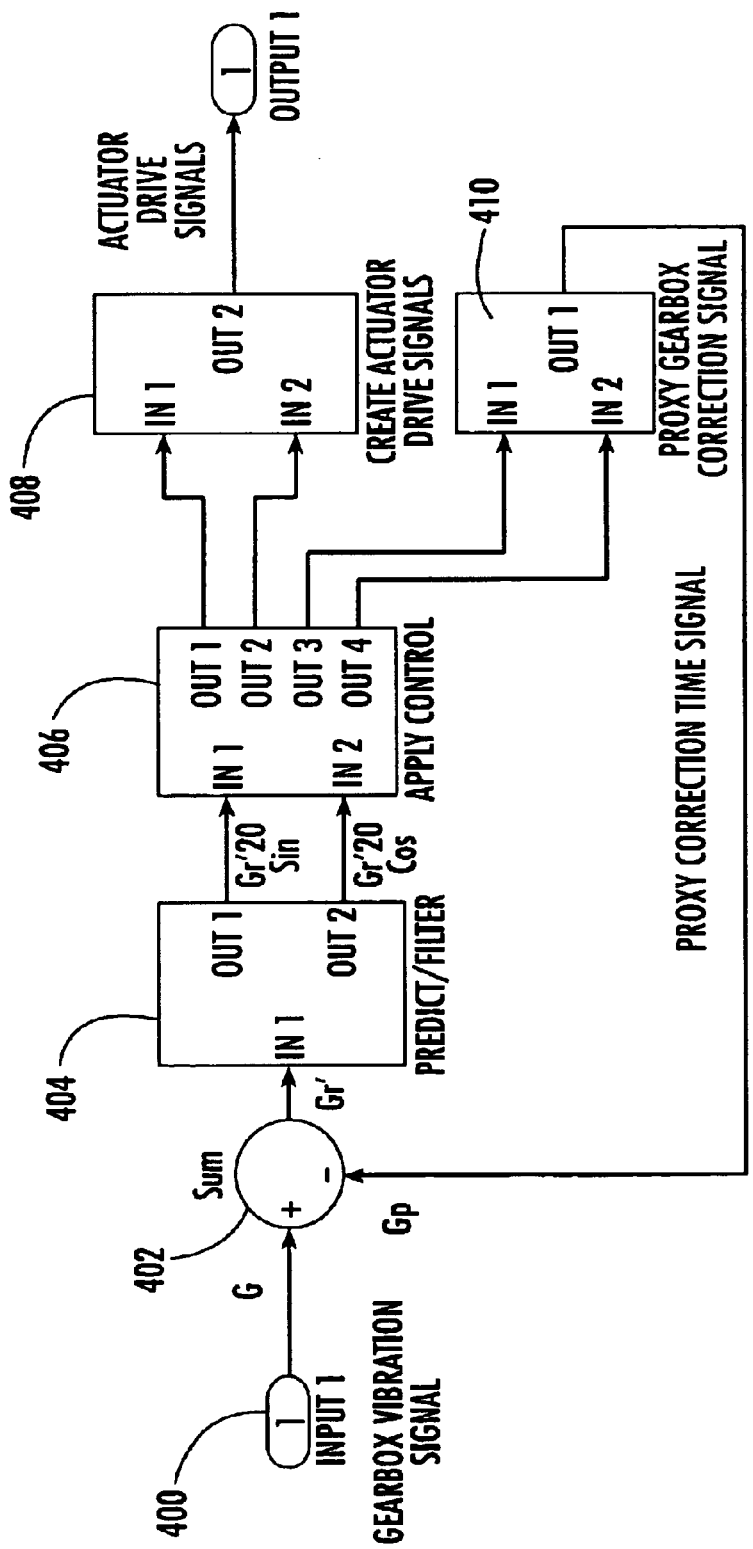
FIG. 18 is a block diagram showing the overall configuration of the real-time demonstration system of this invention.

FIG. 18 presents a schematic diagram of the overall control configuration that resulted. The figure has been modified from its form as implemented on the DSPace system, partly because some of the constructions used on the DSPace system are not supported in ordinary Simulink and partly for improved clarity. In addition, the DSPace implementation of the model required that the inputs and outputs of the model be scaled upward and downward, respectively: inputs to the model had to be scaled up to minimize round-off error, and the outputs scaled down to avoid saturating the analog outputs. This led to some confusion and bookkeeping errors in debugging the system, but the diagram is functionally correct.

The following describes the function of the basic blocks that comprise the system. The overall cycle time for this control system was chosen to be 3 msec, one-half the time delay used for the state space embedding in the predictor. Thus, there were 16.67 control cycles in each 20-Hz blade passing, allowing for a reasonable representation of a 20-Hz sine wave without a dual-clock control algorithm. It turns out that the system could have achieved a cycle time of 1 msec, indicating that the test bed has substantial computational power beyond that required. Implementing the control on a shorter cycle would have increased the bookkeeping required to account for the different analysis cycle times of the predictor and the rest of the control system, so we used the longer cycle time for simplicity.

The raw gearbox vibration signal, G, enters the system via Input1 400. For the ACSR test rig demonstration, this signal did not have to be low-pass filtered to kill the high-frequency gearbox vibrations as it would in a flight version of the system. Still, the accelerometer amplifiers used in the ACSR test rig provide 200-Hz anti-alias filtering, which serves a similar purpose but is less aggressive than would ultimately be used. Sum block 402 subtracts the estimated effect of the actuators on the gearbox response ($G_p$), producing an estimate of the proxy gearbox vibration, $G_r'$.

This signal then moves to Predict/Filter block 404, where six sequential $G_r'$ values are time delay embedded and used to predict the 20-Hz component of $G_r'$, $G_{r20}$. Sixteen sequential values of $G_{r20}$, covering almost a period of the vibration, are used to perform a least-squares estimate of the cosine and sine components of $G_{r20}$, eliminating spurious frequencies.

The cosine and sine components of the 20-Hz proxy vibration then pass to the Apply Control block 406. The 20-Hz components are first multiplied by the control matrix to produce the cosine and sine components of the actuator demand signals. A copy of the actuator demand signals is then multiplied by the proxy gearbox correction matrix to produce the corresponding proxy gearbox corrections. These results then go to respective blocks 408 and 410 where the cosine and sine components are turned into actual time signals. The actuator demand signals are then sent to the analog output ports that drive the actuator servo amplifiers, while the proxy correction signals are fed back to the Proxy Gearbox Correction sum.

The control and proxy gearbox correction matrices were calculated based on previous tests, analogous to being fed from the back office process. The first of these tests is an open-loop test, in which each actuator is driven individually to determine its influence on the accelerometers, including the gearbox accelerometer. This information is used to calculate the proxy gearbox correction matrix and a first estimate for the control matrix. The second test is a closed-loop test, in which the existing ACSR algorithm is used to optimize the control matrix during control. Since the existing ACSR system does not work well with non-periodic signals, the closed loop test was run with a 20-Hz sine wave driving the head shaker. By the same token, the existing ACSR algorithm could be modified to find the optimal control averaged over time, so there is no doubt that the back office process could find the optimal control matrix.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims:

What is claimed is:

1. An active vibration control system comprising:
   a sensor responsive to a source of vibration which provides an output signal representative of the vibrations;
   at least one actuator positioned to impart canceling vibrations to the source of vibrations based on an input signal;
   a correction subsystem responsive to the actuator for estimating the sensor output in the absence of the canceling vibrations and which outputs a corrected output signal representative only of the vibrations emanating from the source; and
   a state space predictor responsive to the corrected output signal for determining the input signal to the actuator based on variations in the corrected output signal to better control vibrations especially in chaotic systems.

2. The active vibration control system of claim 1 in which the sensor is an accelerometer.

3. The active vibration control system of claim 1 in which the sensor is physically connected to the source of vibration.

4. The active vibration control system of claim 1 in which the actuator is an electro-hydraulic actuator.

5. The active vibration control system of claim 1 in which there are a plurality of actuators.

6. The active vibration control system of claim 1 in which the actuator is mounted between the source of vibrations and the structure to be isolated from the source of vibrations.

7. The active vibration control system of claim 1 in which the source of vibrations is the rotor, gear box, and engine assembly of helicopter, the sensor is an accelerometer attached to the gear box, and the actuator is positioned between the airframe of the helicopter and the rotor, gear box, and engine assembly.

8. An improved active vibration control system including a source of vibrations, a structure which is impacted by the source of vibrations, a sensor or sensors connected to the structure, an actuator or actuators positioned to impart canceling vibrations to the source; and an analyzer/control subsystem responsive to the sensor or sensors for driving the actuator or actuators, the improvement comprising:

a sensor to be positioned to detect vibrations directly from the source; and a software package including:

a correction subsystem responsive to the actuator for estimating the sensor output in the absence of the canceling vibrations and which outputs a corrected output signal representative only of the vibrations emanating from the source; and a state space predictor responsive to the corrected output signal for determining the input signal to the actuator based on variations in the corrected output signal to better control vibrations especially in a chaotic system.

9. The active vibration control system of claim 8 in which the sensor is an accelerometer.

10. The active vibration control system of claim 8 in which the sensor is physically connected to the source of vibration.

11. The active vibration control system of claim 8 in which the actuator is an electro-hydraulic actuator.

12. The active vibration control system of claim 8 in which there are a plurality of actuators.

13. The active vibration control system of claim 8 in which the actuator is mounted between the source of vibrations and the structure to be isolated from the source of vibrations.

14. The active vibration control system of claim 8 in which the source of vibrations is the rotor, gear box, and engine assembly of helicopter, the sensor is an accelerometer attached to the gear box, and the actuator is positioned between the airframe of the helicopter and the rotor, gear box, and engine assembly.

15. An active vibration control system comprising:

a sensor responsive to a source of vibration which provides an output signal representative of the vibrations;

at least one actuator positioned to impart canceling vibrations to the source of vibrations based on an input signal; and a correction subsystem responsive to the actuator for estimating the sensor output in the absence of the canceling vibrations and which outputs a corrected output signal representative only of the vibrations emanating from the source.

16. An active vibration control system comprising:

a sensor responsive to a source of vibration which provides an output signal representative of the vibrations;

at least one actuator positioned to impart canceling vibrations to the source of vibrations based on an input signal; and a state space predictor configured to perform non-linear dynamical analysis on the output signal and configured to determine the appropriate input signal to the actuator based on variations in the output signal to better control vibrations especially in chaotic systems and even though the vibration output signal is unstable.

17. An active vibration control system comprising:

a single sensor responsive to sources of vibrations which provides an output signal representative of the vibrations from the sources;

at least one actuator positioned to impart canceling vibrations to the source of vibrations based on an input signal;

a correction subsystem responsive to the actuator for estimating the sensor output in the absence of the canceling vibrations and which outputs a corrected output signal representative only of the vibrations emanating from the sources; and a state space predictor responsive to the corrected output signal for determining the input signal to the actuator based on variations in the corrected output signal to better control vibrations especially in chaotic systems.

18. The active vibration control system of claim 17 in which the sources of vibrations are the rotor, gear box, and engine assembly of a helicopter.

19. An active vibration control system comprising:

a sensor responsive to a source of vibration which provides an output signal representative of the vibrations;

at least one actuator positioned to impart canceling vibrations to the source of vibrations based on an input signal;

a correction subsystem responsive to the actuator for estimating the sensor output in the absence of the canceling vibrations and which outputs a corrected output signal representative only of the vibrations emanating from the source; and a state space predictor configured to perform non-linear dynamical analysis and responsive to the corrected output signal for determining the input signal to the actuator based on variations in the corrected output signal to better control vibrations especially in chaotic systems.

20. An active vibration control system for a helicopter including a rotor blade, said system comprising:

a sensor responsive to a source of vibration which provides an output signal representative of the vibrations;

at least one actuator positioned to impart canceling vibrations to the source of vibrations based on an input signal; and a state space predictor configured to perform non-linear dynamical analysis for predicting the rotor blade passing frequency component of the rotor blade driving force, said state space predictor responsive to the output signal for determining the input signal to the actuator based on variations in the output signal to better control vibrations.

* * * * *